US011874625B2

(12) United States Patent
Anan et al.

(10) Patent No.: US 11,874,625 B2
(45) Date of Patent: Jan. 16, 2024

(54) DEVELOPING CARTRIDGE INCLUDING A MEMBER CONFIGURED TO BE PRESSED BY A MEMBER OF AN IMAGE FORMING APPARATUS

(71) Applicant: CANON KABUSHIKI KAISHA, Tokyo (JP)

(72) Inventors: Osamu Anan, Susono (JP); Masato Tanabe, Susono (JP); Tsukasa Abe, Yokohama (JP); Kazutaka Sueshige, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/071,738

(22) Filed: Nov. 30, 2022

(65) Prior Publication Data

US 2023/0089182 A1 Mar. 23, 2023

Related U.S. Application Data

(62) Division of application No. 17/151,801, filed on Jan. 19, 2021, now Pat. No. 11,656,572, which is a (Continued)

(30) Foreign Application Priority Data

Feb. 29, 2016 (JP) ................................ 2016-038460
Feb. 15, 2017 (JP) ................................ 2017-026341

(51) Int. Cl.
*G03G 15/00* (2006.01)
*G03G 21/16* (2006.01)
(Continued)

(52) U.S. Cl.
CPC ..... *G03G 21/1647* (2013.01); *G03G 15/0806* (2013.01); *G03G 15/0865* (2013.01);
(Continued)

(58) Field of Classification Search
USPC .......................................................... 399/119
See application file for complete search history.

(56) References Cited

U.S. PATENT DOCUMENTS 4,740,767 A * 4/1988 Kawano ............ G03G 21/1647 399/119
6,072,969 A 6/2000 Yokomori et al.
(Continued)

FOREIGN PATENT DOCUMENTS

CN 1920702 A 2/2007
CN 101419412 A 4/2009
(Continued)

OTHER PUBLICATIONS

May 11, 2021 Office Action in Japanese Patent Application No. 2020-120856.
(Continued)

*Primary Examiner* — Quana Grainger
(74) *Attorney, Agent, or Firm* — Venable LLP

(57) ABSTRACT

A second unit includes a restricted portion that comes into contact with a restricting portion provided to a body of an apparatus, the restricted portion coming into contact with the restricting portion, in order to restrict the movement of a developer carrier in a direction to make contact with an image carrier, when a developing cartridge has not reached a predetermined attachment position, and not coming into contact with the restricting portion when the developing cartridge is in the predetermined attachment position.

20 Claims, 15 Drawing Sheets

Related U.S. Application Data division of application No. 16/043,328, filed on Jul. 24, 2018, now Pat. No. 10,928,769, which is a division of application No. 15/438,950, filed on Feb. 22, 2017, now Pat. No. 10,067,461.

(51) Int. Cl.
*G03G 15/08* (2006.01)
*G03G 21/18* (2006.01)

(52) U.S. Cl.
CPC ....... *G03G 21/1676* (2013.01); *G03G 21/185* (2013.01); *G03G 21/1825* (2013.01); *G03G 21/1846* (2013.01); *G03G 2221/1657* (2013.01)

(56) References Cited

U.S. PATENT DOCUMENTS

| | | | |
|---|---|---|---|
| 7,099,607 | B2 | 8/2006 | Suzuki et al. |
| 7,366,439 | B2 | 4/2008 | Anan et al. |
| 7,715,746 | B2 | 5/2010 | Tanabe et al. |
| 7,720,412 | B2 | 5/2010 | Anan et al. |
| 7,813,671 | B2 | 10/2010 | Nittani et al. |
| 7,894,733 | B2 | 2/2011 | Tanabe et al. |
| 7,953,340 | B2 | 5/2011 | Tanabe et al. |
| 8,095,036 | B2 | 1/2012 | Yoshino et al. |
| 8,160,477 | B2 | 4/2012 | Anan et al. |
| 8,301,054 | B2 | 10/2012 | Tanabe et al. |
| 8,494,409 | B2 | 7/2013 | Kawai et al. |
| 8,577,252 | B2 | 11/2013 | Anan et al. |
| 9,188,945 | B2 | 11/2015 | Kawai et al. |
| 9,285,765 | B2 | 3/2016 | Anan et al. |
| 2003/0138270 | A1 | 7/2003 | Matsuoka |
| 2003/0185587 | A1 | 10/2003 | Kawai et al. |
| 2004/0184835 | A1 | 9/2004 | Park |
| 2006/0120754 | A1 | 6/2006 | Suzuki et al. |
| 2007/0048008 | A1 | 3/2007 | Kamimura |
| 2007/0059033 | A1 | 3/2007 | Kitozaki |
| 2007/0077086 | A1 | 4/2007 | Takakuwa et al. |
| 2007/0092291 | A1 | 4/2007 | Suzuki et al. |
| 2008/0138110 | A1 | 6/2008 | Yoshino et al. |
| 2008/0253803 | A1 | 10/2008 | Nittani et al. |
| 2009/0109448 | A1 | 4/2009 | Kiyono et al. |
| 2009/0297214 | A1 | 12/2009 | Chadani et al. |
| 2009/0297216 | A1 | 12/2009 | Kawai |
| 2009/0297219 | A1 | 12/2009 | Yoshino et al. |
| 2011/0142491 | A1 | 6/2011 | Numata et al. |
| 2011/0158703 | A1 | 6/2011 | Sato et al. |
| 2011/0229196 | A1 | 9/2011 | Kawai et al. |
| 2012/0107739 | A1 | 5/2012 | Yamashita et al. |
| 2012/0269543 | A1 | 10/2012 | Hashimoto |
| 2013/0223853 | A1 | 8/2013 | Chadani et al. |
| 2013/0223878 | A1 | 8/2013 | Sato et al. |
| 2014/0003838 | A1 | 1/2014 | Kawai et al. |
| 2014/0112679 | A1 | 4/2014 | Choi |
| 2014/0140725 | A1 | 5/2014 | Kawasumi |
| 2014/0169829 | A1 | 6/2014 | Maeshima et al. |
| 2015/0277370 | A1 | 10/2015 | Maeshima et al. |
| 2016/0018784 | A1 | 1/2016 | Maeshima et al. |
| 2017/0075291 | A1 | 3/2017 | Yamaguchi |
| 2017/0082971 | A1 | 3/2017 | Maeshima et al. |

FOREIGN PATENT DOCUMENTS

| | | | |
|---|---|---|---|
| CN | 102193472 | A | 9/2011 |
| CN | 102467032 | A | 5/2012 |
| EP | 2 933 690 | A1 | 10/2015 |
| JP | 63-100481 | A | 5/1988 |
| JP | S63-100481 | A | 5/1988 |
| JP | 07-133044 | A | 5/1995 |
| JP | H07-133044 | A | 5/1995 |
| JP | H07-234552 | A | 9/1995 |
| JP | 2001-100476 | A | 4/2001 |
| JP | 2003-241621 | A | 8/2003 |
| JP | 2003-280374 | A | 10/2003 |
| JP | 2005-043538 | A | 2/2005 |
| JP | 2006-276190 | A | 10/2006 |
| JP | 2008-261910 | A | 10/2008 |
| JP | 2009-288302 | A | 12/2009 |
| JP | 2010-054828 | A | 3/2010 |
| JP | 2010-211176 | A | 9/2010 |
| JP | 2010-231113 | A | 10/2010 |
| JP | 2012-230136 | A | 11/2012 |
| JP | 2014-102425 | A | 6/2014 |
| JP | 2014-134788 | A | 7/2014 |
| RU | 2 370 802 | C2 | 10/2009 |

OTHER PUBLICATIONS

Oct. 4, 2022 Office Action in Japanese Patent Application No. 2021-175524 A.
Aug. 30, 2022 Office Action in Japanese Patent Application No. 2021-145313 A.
English translation of Japanese Patent Application Pub. No. H07-234552 A.
Office Action in Russian Patent Application No. 2017106227, dated May 8, 2018.
English Translation of May 8, 2018 Office Action in Russian Patent Application No. 2017106227.
Extended Search Report in European Patent Application No. 17158071.5, dated Jul. 28, 2017.
Extended Search Report in European Patent Application No. 17158069.9, dated Jul. 28, 2017.
Dec. 4, 2019 Office Action in Chinese Patent Application No. 201710097799.4 (with English translation).
Dec. 8, 2020 Office Action in Japanese Patent Application No. 2017-026341 (with English translation).
Dec. 8, 2020 Office Action in European Patent Application No. 17 158 069.9.
Jan. 5, 2023 Notice of Allowance in Chinese Patent Application No. 202011126236.1.

* cited by examiner

DEVELOPING CARTRIDGE INCLUDING A MEMBER CONFIGURED TO BE PRESSED BY A MEMBER OF AN IMAGE FORMING APPARATUS

BACKGROUND OF THE INVENTION

Field of the Invention

This invention relates to a developing cartridge capable of being attached and detached with respect to the body of an image forming apparatus and an image forming apparatus that forms an image on a recording medium using electrophotographic technology.

Description of the Related Art

In an image forming apparatus such as a printer using an electrophotographic process, a photosensitive drum is first uniformly charged. The charged photosensitive drum is selectively exposed to form an electrostatic latent image on the photosensitive drum. The electrostatic latent image formed on the photosensitive drum is developed by a toner to forma toner image on the photosensitive drum. The toner image formed on the photosensitive drum is transferred onto a recording medium such as paper. The toner image transferred onto the recording medium is heated and pressurized to fix the toner image on the recording medium.

For such an image forming apparatus, maintenance of respective process means (such as a photosensitive drum, developing device, and a charge roller), a toner refill, and the like are necessary. Thus, in order to facilitate maintenance of respective process means, a toner refill, and the like, a process cartridge has been put into use in which a photosensitive drum, a charge roller, and a developing device are integrated. Such a process cartridge is attachable and detachable with respect to the body of an image forming apparatus. By replacement of a process cartridge, a user can perform maintenance of the respective process means, a toner refill, and the like.

In some process cartridges, a photoreceptor cartridge in which a cleaning blade to clean the surface of a photosensitive drum, the photosensitive drum, a charge roller, and the like are integrated and a developing cartridge in which a developing roller and the like are integrated are capable of being attached and detached separately. In such cases, the photoreceptor cartridge and the developing cartridge can be replaced individually. In the case where such a design is employed, a photoreceptor cartridge and a developing cartridge can each be replaced respectively at an appropriate timing.

Such a design in which a photoreceptor cartridge and a developing cartridge are replaced individually often employs a mechanism to cause a photosensitive drum and a developing roller to come into contact or separate. During replacement of the developing cartridge, the developing cartridge is inserted to the body of an image forming apparatus in a state where the developing roller is separated from the photosensitive drum, so that the developing roller does not slide against the photosensitive drum.

In recent years, image forming apparatuses that form a color image using a plurality of colors of toners have become widespread. In such color image forming apparatuses, photosensitive drums respectively corresponding to the plurality of colors of toners are arranged in a single line along the moving direction of an intermediate transfer belt that is for a primary transfer of a toner image formed on the photosensitive drum. Such image forming apparatuses are called inline image forming apparatuses. In some inline image forming apparatuses, a plurality of photosensitive drums are arranged in a single line in a direction intersecting with the vertical direction. An inline design can easily meet the demands for increasing the speed of image formation or application in a multifunction printer.

In a technique disclosed in Japanese Patent Application Laid-open No. 2014-102425, a cover provided to the body of an image forming apparatus is opened, at the time of attachment of a developing cartridge to the image forming apparatus, to expose an opening provided to the body. From that opening, the developing cartridge is inserted into the body. In a state where the developing cartridge is being inserted to the body, the developing cartridge is guided by a guide rail to bring about a state where a developing roller is separated from a photosensitive drum. Closing the cover in a state where the developing cartridge has been attached to the body causes the guide rail guiding the developing cartridge to move, such that the developing roller comes into contact with the photosensitive drum.

In the technique disclosed in Japanese Patent Application Laid-open No. 2014-102425, the developing cartridge is attached to or detected from the body while being guided by the guide rail that is movable with respect to the body. Due to a slight gap between the developing cartridge and the guide rail, a slight movement of the developing cartridge with respect to the guide rail may occur at the time of attachment or detachment of the developing cartridge. Accordingly, there have been cases where the developing cartridge wobbles with respect to the body. In such cases, there is a risk of the developing roller making contact with the photosensitive drum. It is conceivable to provide a sufficient gap between the developing roller and the photosensitive drum to prevent the developing roller and the photosensitive drum from making contact. However, in the case of providing the sufficient gap between the developing roller and the photosensitive drum, there has been a risk that the image forming apparatus increases in size. In the case of providing the gap between the developing roller and the photosensitive drum in the inline design described above, there has been a risk that the image forming apparatus further increases in size in the direction in which the photosensitive drums are aligned.

SUMMARY OF THE INVENTION

An object of the present invention is to prevent a developing cartridge from being damaged, during the developing cartridge being attached to or detached from the body of an apparatus.

In order to achieve the object described above, a developing cartridge according to the present invention is a developing cartridge capable of being attached to and detached from a body of an image forming apparatus, the developing cartridge comprising:

a first unit fixed to the body when the developing cartridge is in a predetermined attachment position in the body; and a second unit supporting a developer carrier that is to make contact with an image carrier provided to the body, the second unit being assembled to be movable with respect to the first unit for contact or separation of the developer carrier with respect to the image carrier, such that an inserting direction in which the developing cartridge is guided up to the predetermined attachment position and a direction in which the developer carrier makes contact with or separates from the image carrier differ, and such that the second unit includes a restricted portion that comes into contact with a restricting portion provided to the body, the restricted portion coming into contact with the restricting portion when the developing cartridge has not reached the predetermined attachment position and not coming into contact with the restricting portion when the developing cartridge is in the predetermined attachment position.

In order to achieve the object described above, an image forming apparatus according to the present invention is an image forming apparatus comprising:

the developing cartridge and the body;

wherein the image carrier is an image carrier on which an electrostatic latent image is formed, wherein the developer carrier is a developer carrier that carries a developer for developing the electrostatic latent image, and wherein the developer formed on the image carrier is transferred to a recording medium to form an image on the recording medium.

The present invention can prevent a developing cartridge from being damaged, during the developing cartridge being attached to or detached from the body of an apparatus.

Further features of the present invention will become apparent from the following description of exemplary embodiments with reference to the attached drawings.

DESCRIPTION OF THE EMBODIMENTS

Modes for carrying out the present invention are illustratively explained in detail below on the basis of embodiment with reference to the drawings. However, dimensions, materials, and shapes of components described in the embodiments, relative arrangement of the components, and the like should be changed as appropriate according to the configuration of an apparatus to which the invention is applied and various conditions. That is, the dimensions, the materials, the shapes, and the relative arrangement are not intended to limit the scope of the present invention to the embodiments.

Embodiment 1

<Overall Configuration of Image Forming Apparatus>

Figure 2:
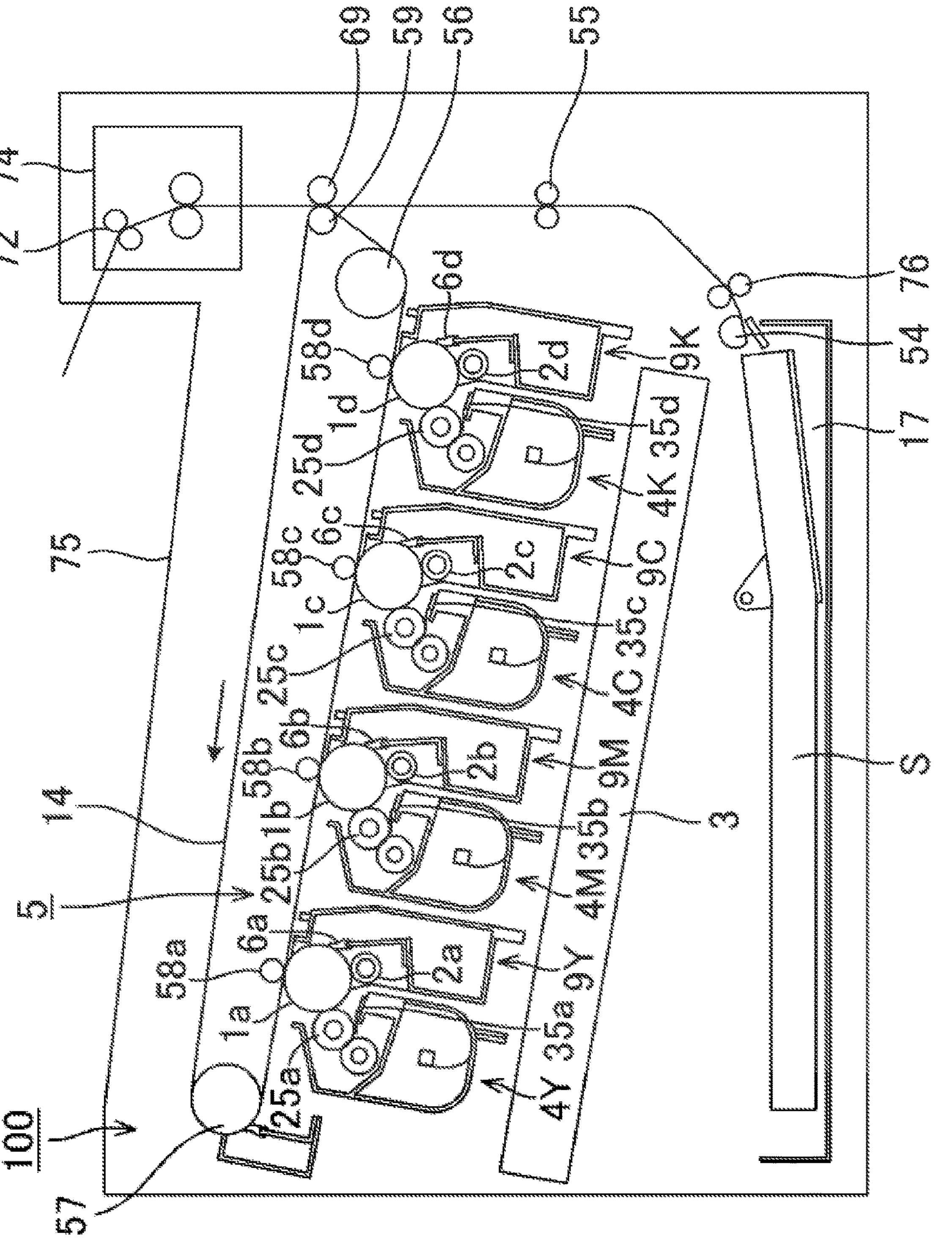
FIG. 2 is a schematic sectional view of an image forming apparatus according to Embodiment 1.

First, the overall configuration of an electrophotographic image forming apparatus 100 (hereinafter referred to as image forming apparatus 100) will be described using FIG. 2. As shown in FIG. 2, four drum cartridges 9 (9Y, 9M, 9C and 9K) capable of being attached and detached and four developing cartridges 4 (4Y, 4M, 4C, and 4K) are attached to the body of the image forming apparatus 100 by an attachment member (not shown). In this embodiment, the developing cartridge 4 and the drum cartridge 9 are adjacent. In this embodiment, the upstream side in the direction of attachment of the drum cartridge 9 and the developing cartridge 4 to the image forming apparatus 100 is defined as the near-side surface side, and the downstream side in the direction of attachment is defined as the far-side surface side. In this embodiment, the direction of attaching the drum cartridge 9 and the developing cartridge 4 to the image forming apparatus 100 is the horizontal direction. In FIG. 2, the drum cartridge 9 and the developing cartridge 4 are provided together in a direction inclined with respect to the horizontal direction, within the image forming apparatus 100.

The respective drum cartridges 9 are provided with electrophotographic photosensitive drums 1 (hereinafter referred to as photosensitive drums 1) (1*a*, 1*b*, 1*c*, and 1*d*) that are image carriers as body-side members and charge rollers 2 (2*a*, 2*b*, 2*c*, and 2*d*) provided in the periphery of the photosensitive drums 1. The respective drum cartridges 9 are provided with cleaning members 6 (6*a*, 6*b*, 6*c*, and 6*d*) that clean up a toner as a developer remaining on the photosensitive drum 1. In this embodiment, process means such as the photosensitive drum 1, the charge roller 2, and the cleaning member 6 are integrated as the drum cartridge 9.

The respective developing cartridges 4 (4Y, 4M, 4C, and 4K) include process means such as developing rollers 25 (25*a*, 25*b*, 25*c*, and 25*d*) that are developer carriers as cartridge-side members and developing blades 35 (35*a*, 35*b*, 35*c*, and 35*d*). The charge roller 2 uniformly charges the surface of the photosensitive drum 1, and the developing roller 25 develops, with a toner, an electrostatic latent image formed on the photosensitive drum 1. The cleaning member 6 removes a toner remaining on the photosensitive drum 1 after a toner image formed on the photosensitive drum 1 has been transferred onto a recording medium S.

Below the drum cartridge 9 and the developing cartridge 4, a scanner cartridge 3 is provided that forms an electrostatic latent image on the photosensitive drum 1 by selectively exposing the photosensitive drum 1 on the basis of image information. In the lower part of the image forming apparatus 100, a cassette 17 for accommodating the recording medium S is attached. The image forming apparatus 100 is provided with recording medium conveying means for conveying the recording medium S to the upper part of the image forming apparatus 100 past a secondary transfer roller 69 and a fixing portion 74. Specifically, the image forming apparatus 100 is provided with a feeding roller 54 that separates and feeds the recording medium S within the cassette 17, one sheet at a time. The image forming apparatus 100 is provided with a conveying roller pair 76 that conveys the fed recording medium S and a resist roller pair 55 for synchronization of an electrostatic latent image formed on the photosensitive drum 1 and the recording medium S.

Above the drum cartridge 9 and the developing cartridge 4, an intermediate transfer cartridge 5 is provided as intermediate transfer means for transferring toner images formed on the respective photosensitive drums 1 (1*a*, 1*b*, 1*c*, and 1*d*) onto the recording medium S. The intermediate transfer cartridge 5 includes a driving roller 56, a driven roller 57, and primary transfer rollers 58 (58*a*, 58*b*, 58*c*, and 58*d*) arranged in positions opposing the photosensitive drums 1 of respective colors. The intermediate transfer cartridge 5 includes an opposing roller 59 arranged in a position opposing the secondary transfer roller 69. A transfer belt 14 is wound around by the driving roller 56, the driven roller 57, the primary transfer rollers 58, and the opposing roller 59.

The transfer belt 14 circulates to oppose and contact all of the photosensitive drums 1. The primary transfer roller 58 (58*a*, 58*b*, 58*c*, or 58*d*) is applied with a voltage fora primary transfer of a toner image on the photosensitive drum 1 onto the transfer belt 14. The opposing roller 59 arranged within the transfer belt 14 and the secondary transfer roller 69 are applied with a voltage for a secondary transfer of a toner image on the transfer belt 14 onto the recording medium S.

In the case of forming a toner image on the photosensitive drum 1, the rotating photosensitive drum 1 is first uniformly charged by the charge roller 2. The charged photosensitive drum 1 is selectively exposed by the scanner cartridge 3 to form an electrostatic latent image on the photosensitive drum 1. The electrostatic latent image formed on the photosensitive drum 1 is developed by the developing roller 25. Accordingly, toner images of the respective colors are formed on the respective photosensitive drums 1.

In synchronization with the operation of forming the toner image on the photosensitive drum 1, the resist roller pair 55 conveys the recording medium S to a secondary transfer position in which the opposing roller 59 and the secondary transfer roller 69 are in contact via the transfer belt 14. The secondary transfer roller 69 is applied with a transfer bias voltage for the secondary transfer of the toner images of the respective colors on the transfer belt 14 onto the recording medium S, as described above. Accordingly, a color toner image is formed on the recording medium S. Then, the recording medium S on which the color toner image is formed is heated and pressurized by the fixing portion 74 to fix the toner image on the recording medium S. The recording medium S on which the toner image has been fixed is discharged to a discharge portion 75 by a discharging roller 72. The fixing portion 74 is arranged in the upper part of the image forming apparatus 100.

<Overall Configuration of Cartridge>

Figure 3:
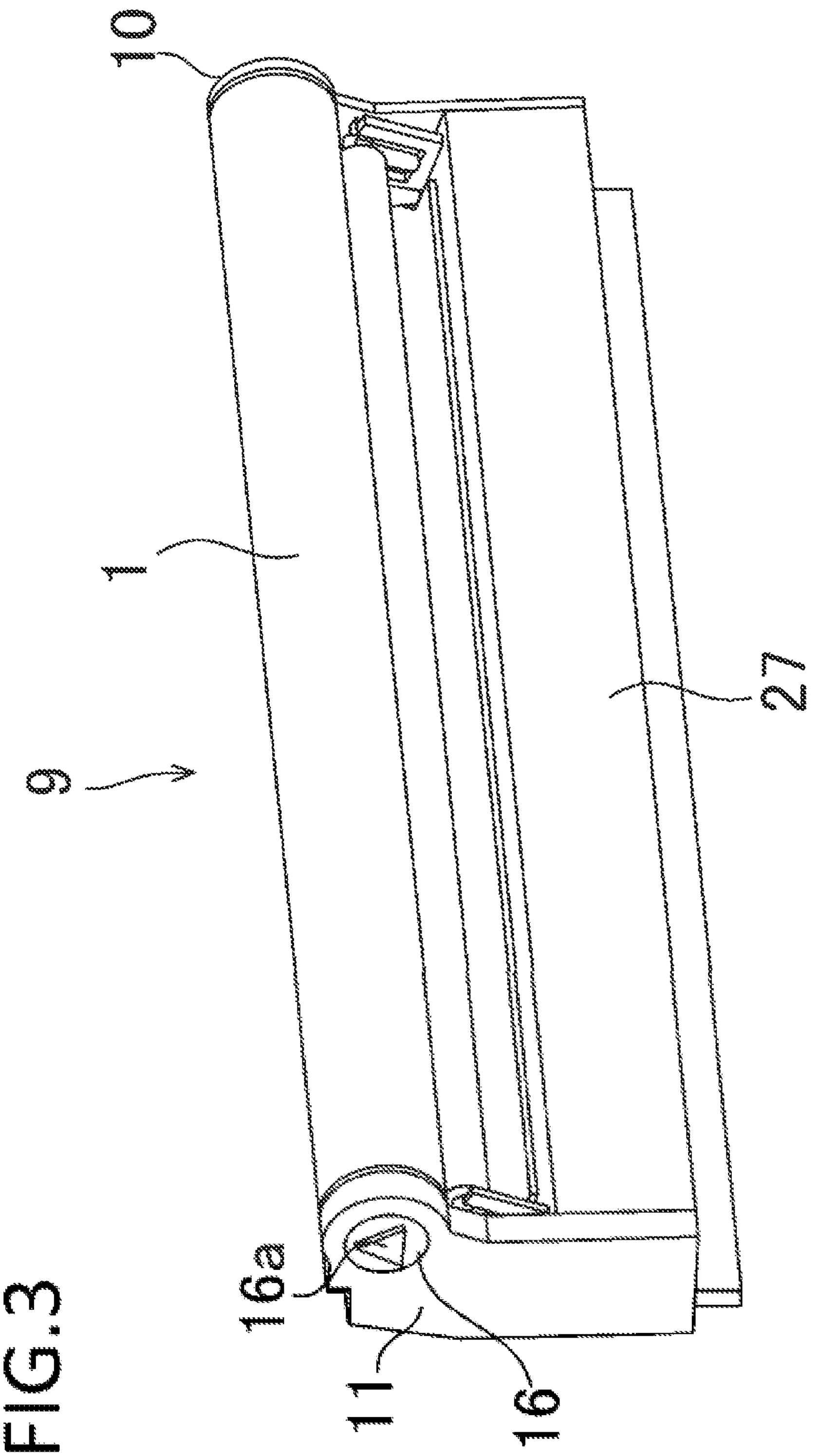
FIG. 3 is an external perspective view of a drum cartridge according to Embodiment 1.
Figure 4:
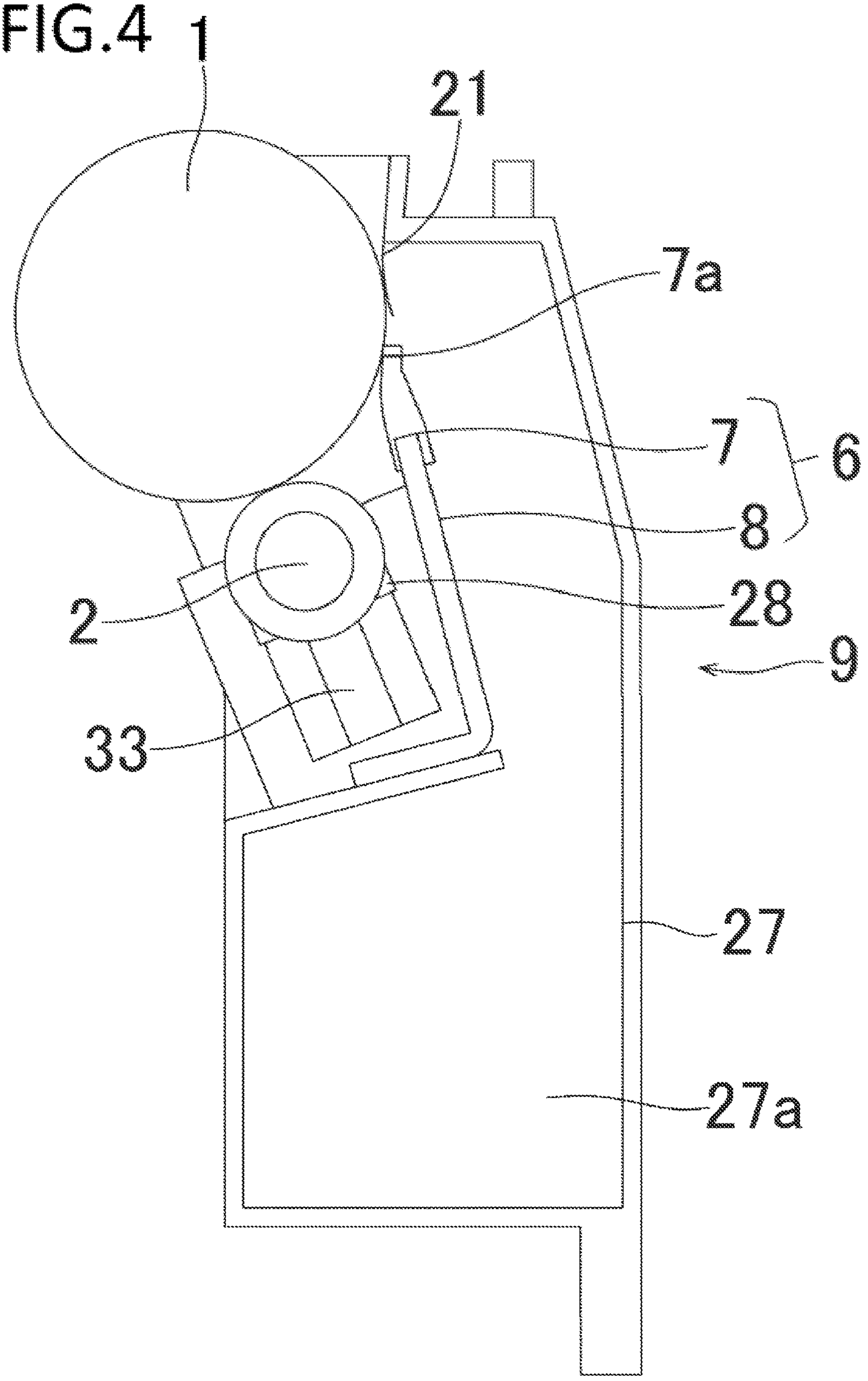
FIG. 4 is a schematic sectional view of the drum cartridge according to Embodiment 1.

Next, the drum cartridge 9 and the developing cartridge 4 according to this embodiment will be described. First, the configuration of the drum cartridge 9 will be described using FIGS. 3 and 4. FIG. 3 is an external perspective view of the drum cartridge 9 according to Embodiment 1. FIG. 4 is a schematic sectional view of the drum cartridge 9 according to Embodiment 1. In this embodiment, the configurations of the drum cartridges 9 (9Y, 9M, 9C, and 9K) are the same.

In this embodiment, regarding the inserting direction of the drum cartridge 9 and the developing cartridge 4, the upstream side of the inserting direction is defined as the near side, and the downstream side of the inserting direction is defined as the far side. To a cleaning frame body 27 of the drum cartridge 9 (9Y, 9M, 9C or 9K), the photosensitive drum 1 is rotatably supported by a near drum bearing 10 and a far drum bearing 11. At one end side of the photosensitive drum 1 in the direction of the central axis of rotation of the photosensitive drum 1, a flange 16 including a drum coupling 16*a* is provided.

In the periphery of the photosensitive drum 1, as described above, the charge roller 2 and the cleaning member 6 are provided. The cleaning member 6 is configured of a rubber blade 7 formed of an elastic member and a cleaning support member 8. A tip end portion 7*a* of the rubber blade 7 is in contact with the photosensitive drum 1 in a direction against the rotating direction of the photosensitive drum 1. A residual toner removed from the surface of the photosensitive drum 1 by the cleaning member 6 falls to a removed toner chamber 27*a*. A holding sheet 21 to prevent a toner within the removed toner chamber 27*a* from coming out is in contact with the photosensitive drum 1.

The drive force of a body driving motor (not shown) that is a drive source is transmitted to the drum cartridge 9 to rotate and drive the photosensitive drum 1 in accordance with an image forming operation. The charge roller 2 is attached, to be capable of rotating, to the drum cartridge 9 via a charge roller bearing 28. The charge roller 2 is pressurized in the direction of the photosensitive drum 1 by the charge-roller pressurizing member 33 to be rotated in accordance with the photosensitive drum 1.

Figure 5:
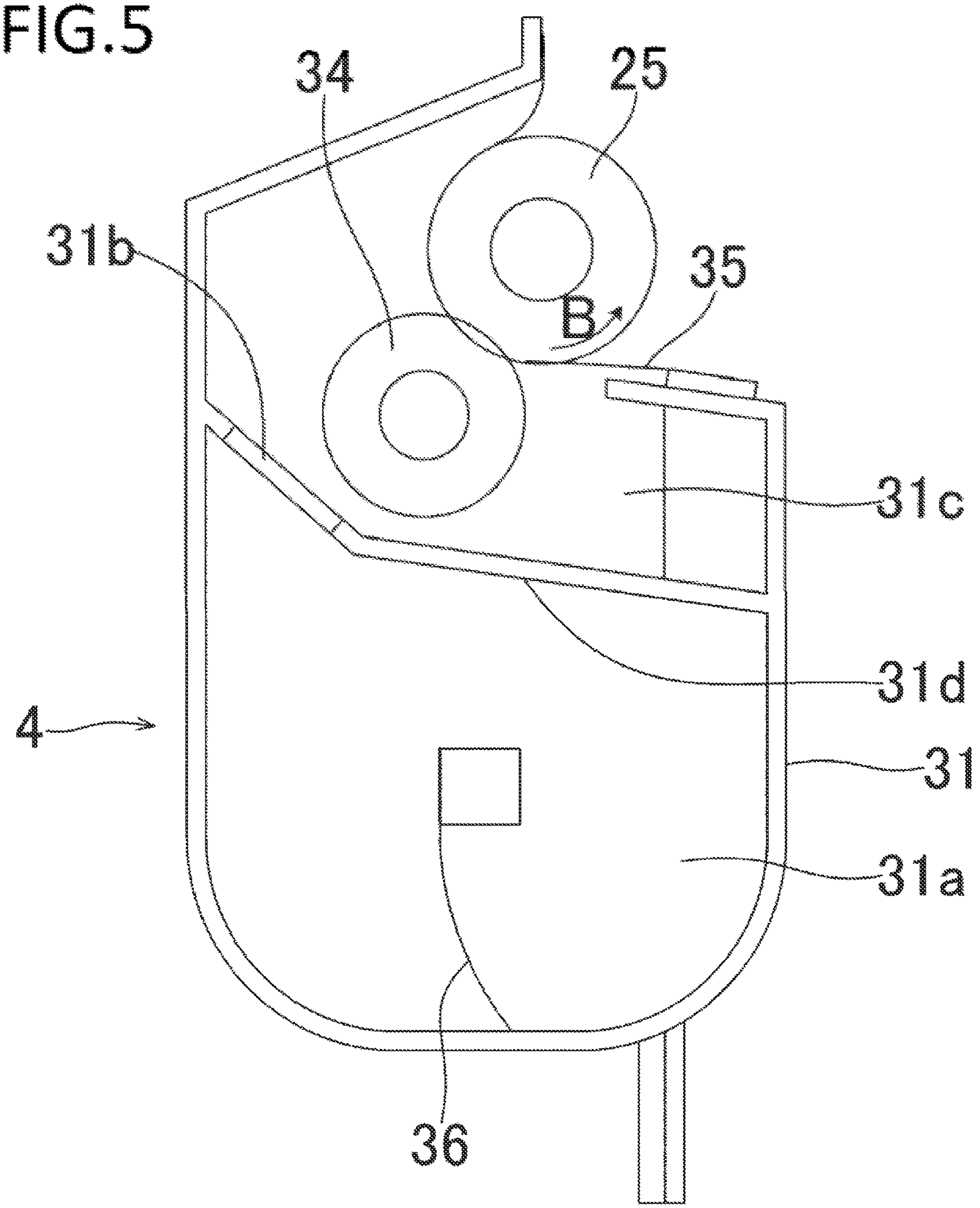
FIG. 5 is a schematic sectional view of a developing cartridge according to Embodiment 1.
Figure 6:
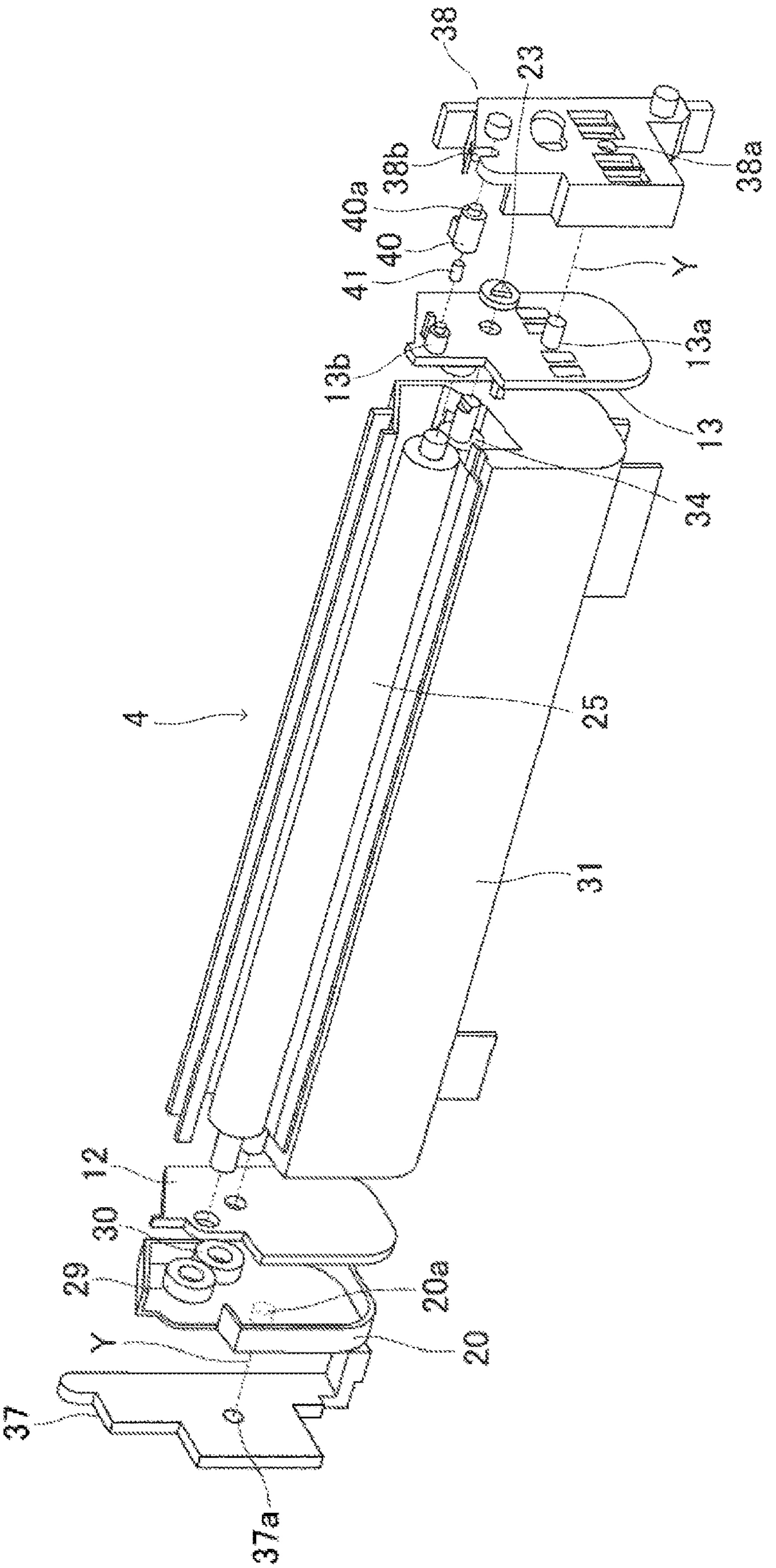
FIG. 6 is an exploded perspective view of the developing cartridge according to Embodiment 1.

Next, the developing cartridge 4 will be described using FIGS. 5 and 6. FIG. 5 is a schematic sectional view of the developing cartridge 4 according to Embodiment 1. FIG. 6 is an exploded perspective view of the developing cartridge 4 according to Embodiment 1. In this embodiment, the developing cartridge 4Y accommodating a yellow toner, the developing cartridge 4M accommodating a magenta toner, and the developing cartridge 4C accommodating a cyan toner are the same in configuration. The developing cartridge 4K accommodating a black toner is also similar in configuration.

The developing cartridge 4 includes the developing roller 25 that rotates in an arrow B direction while making contact with the photosensitive drum 1 and a toner supply roller 34 that rotates while making contact with the developing roller 25. The developing cartridge 4 includes the developing blade 35 for restricting the thickness of a toner layer on the developing roller 25 and a toner conveying member 36. The developing cartridge 4 includes a developing frame body 31 as a second unit that supports the toner supply roller 34, the developing blade 35, and the toner conveying member 36, in addition to the developing roller 25.

The developing frame body 31 includes a developing chamber 31*c* in which the developing roller 25 is arranged and a toner accommodating chamber 31*a* provided below the developing chamber 31*c*. The toner accommodating chamber 31*a* of the developing frame body 31 is provided with the toner conveying member 36 for stirring accommodated toners and conveying the toner to the developing chamber 31*c* from the toner accommodating chamber 31*a* via an opening portion 31*b*. The toner accommodating chamber 31*a* and the developing chamber 31*c* are partitioned by a partition wall 31*d*. The partition wall 31*d* is provided with the opening portion 31*b* through which the toner passes at the time of the toner being conveyed to the developing chamber 31*c* from the toner accommodating chamber 31*a* by the toner conveying member 36.

As shown in FIG. 6, the developing roller 25 and the toner supply roller 34 are rotatably supported to the developing frame body 31 via a near developing bearing 12 and a far developing bearing 13, as a part of the developing frame body 31, provided on two sides in the direction of the central axis of rotation of the developing roller 25. At the far-side end portion of the toner supply roller 34, a developing coupling 23 is provided. At the near-side end portion of the toner supply roller 34, a toner supply gear 30 is provided. At the near-side end portion of the developing roller 25, a developing gear 29 that meshes with the toner supply gear 30 is provided. Therefore, by the drive force of the body driving motor (not shown) that is a drive source being transmitted to the developing coupling 23, the toner supply roller 34 and the developing roller 25 are rotated and driven in accordance with an image forming operation. On the outside of the developing gear 29 and the toner supply gear 30, a gear cover 20 as a part of the developing frame body 31 is provided.

At two end portions of the developing frame body 31 in the direction of the central axis of rotation of the developing roller 25, a near-side end portion holder 37 and a far-side end portion holder 38 as a first unit are provided. The far-side end portion holder 38 is provided with a lifting hole 38*a* that engages with a boss 13*a* provided to the far developing bearing 13. The near-side end portion holder 37 is provided with a lifting hole 37*a* that engages with a boss 20*a* provided to the gear cover 20. The near-side end portion holder 37 and the far-side end portion holder 38 are capable of rotating with respect to a central axis of rotation Y connecting the boss 13*a* of the far developing bearing 13 and the boss 20*a* of the gear cover 20. Therefore, the near-side end portion holder 37 and the far-side end portion holder 38 are each rotatable independently with respect to the developing frame body 31.

<Configuration of Movement Restricting Portion of Far-Side End Portion Holder>

Figure 7:
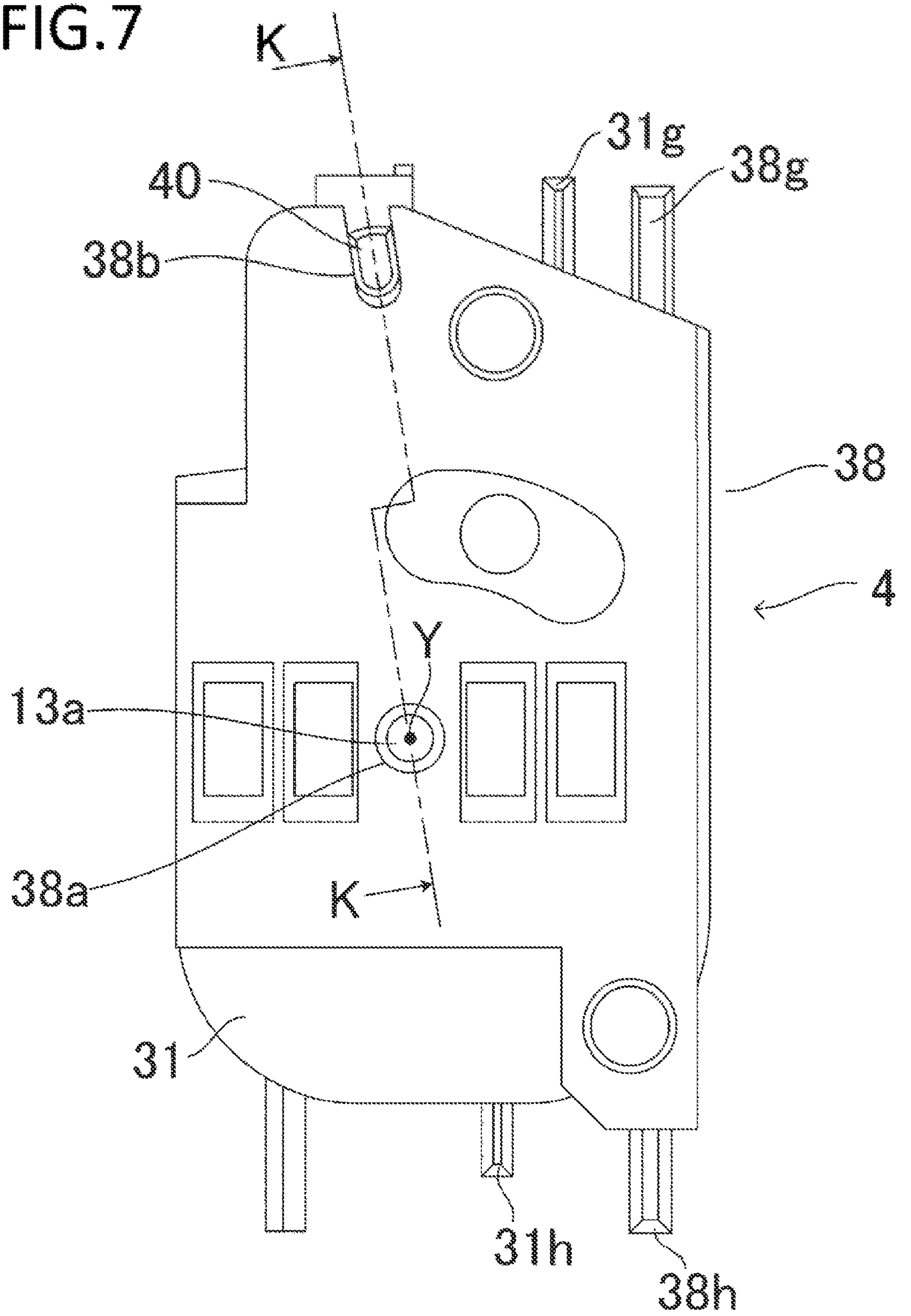
FIG. 7 is a side view of the developing cartridge according to Embodiment 1.
Figure 8A:
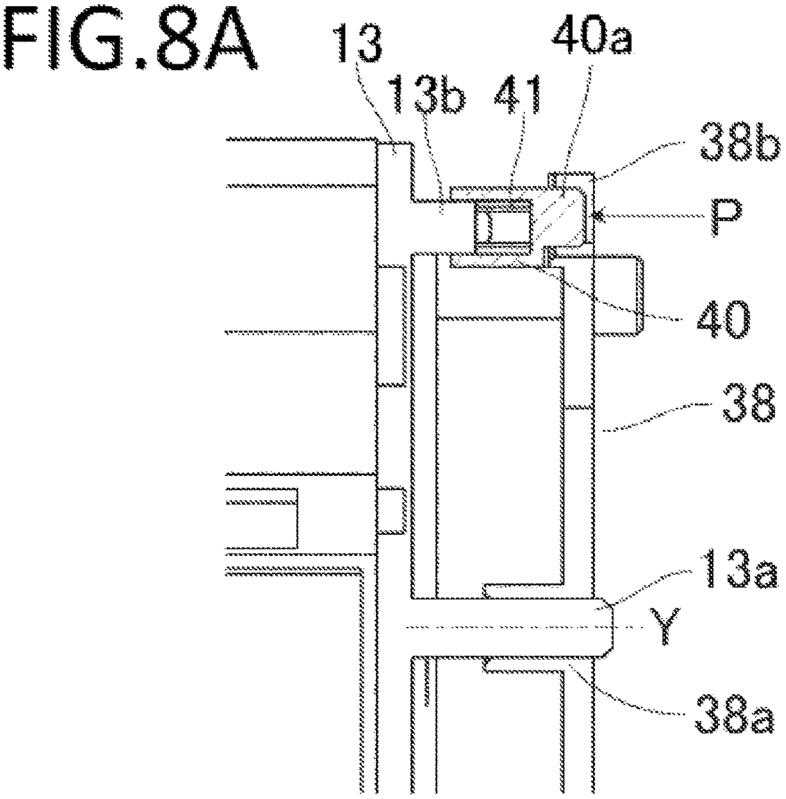
FIGS. 8A and 8B are views illustrating a configuration with which a developing frame body is positioned with respect to a far-side end portion holder.
Figure 8B:
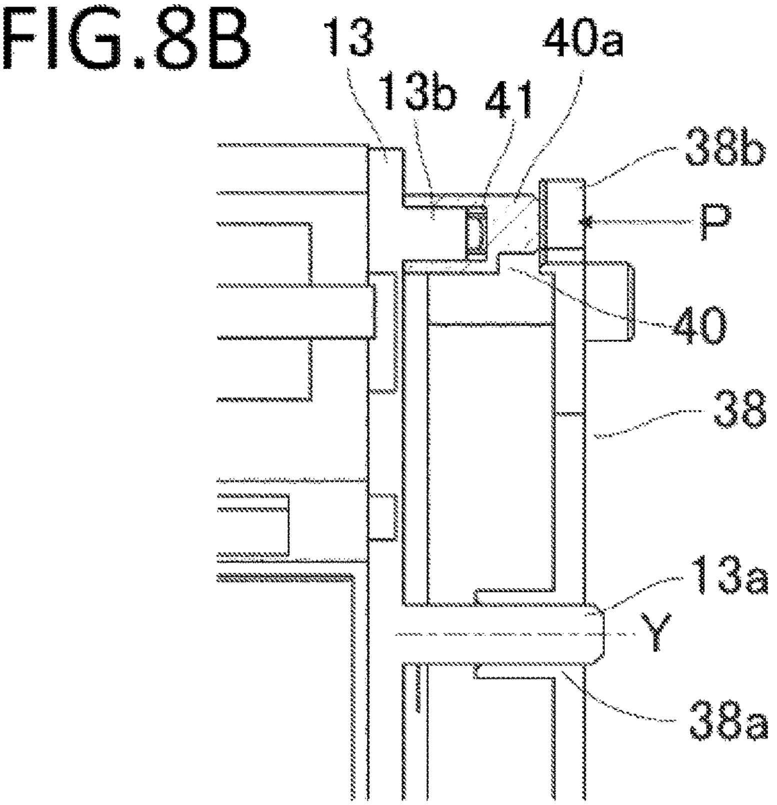

Next, using FIGS. 6 to 8, a configuration to restrict the rotation of the far-side end portion holder 38 will be described. FIG. 7 is a side view of the developing cartridge 4 according to Embodiment 1. FIGS. 8A and 8B are views (sectional views along line K-K in FIG. 7) illustrating a configuration with which the developing frame body 31 is positioned with respect to the far-side end portion holder 38.

As shown in FIG. 6, a restricting member 40 as means for restricting the rotation of the far-side end portion holder 38 is attached to the far developing bearing 13. Inside the restricting member 40, a restricting spring 41 attachable to a spring support portion 13*b* of the far developing bearing 13 is provided. With respect to the restricting member 40, the restricting spring 41 applies a urging force that acts in the direction of insertion of the developing cartridge 4. The far-side end portion holder 38 is provided with a groove portion 38*b* capable of engaging with a restricting portion 40*a* of the restricting member 40. As described above, the far developing bearing 13 is provided with the boss 13*a* along the central axis about which the developing frame body 31 swings, and the far-side end portion holder 38 is provided with the lifting hole 38*a* capable of engaging with the boss 13*a*.

The far-side end portion holder 38 is assembled to the developing frame body 31 (see FIGS. 7 and 8A) in a state where the lifting hole 38*a* and the boss 13*a* are engaged and where the restricting portion 40*a* of the restricting member 40 and the groove portion 38*b* are engaged. Therefore, the engagement of the far-side end portion holder 38 and the restricting member 40 restricts the turn of the far-side end portion holder 38 about the central axis along the boss 13*a*. When the restricting member 40 is pressed in a P direction in FIG. 8 from a state where the far-side end portion holder 38 and the restricting member 40 are engaged, the restricting member 40 moves in the P direction while compressing the restricting spring 41 arranged inside the restricting member 40. This disengages the restricting portion 40*a* of the restricting member 40 and the groove portion 38*b* of the far-side end portion holder 38 (see FIG. 8B). Accordingly, the developing frame body 31 is made capable of turning about the central axis along the boss 13*a* of the far developing bearing 13, with respect to the far-side end portion holder 38. That is, a relative movement between the far-side end portion holder 38 and the developing frame body 31 is allowable.

In this manner, by causing the far-side end portion holder 38 and the restricting member 40 to engage and restrict the turn of the far-side end portion holder 38, the turn of the developing frame body 31 with respect to the far-side end portion holder 38 is restricted in a state where the developing cartridge 4 is not attached to the image forming apparatus 100. In a state where the developing cartridge 4 has been attached to the image forming apparatus 100, the restricting member 40 is pressed in the P direction by a restriction releasing portion (not shown) provided to the body of the image forming apparatus 100. Accordingly, the far-side end portion holder 38 and the restricting member 40 are disengaged, and the far-side end portion holder 38 is made capable of turning with respect to the developing frame body 31 (thus allowing a relative movement).

<Description on Contacting and Separating Operation>

Figure 9A:
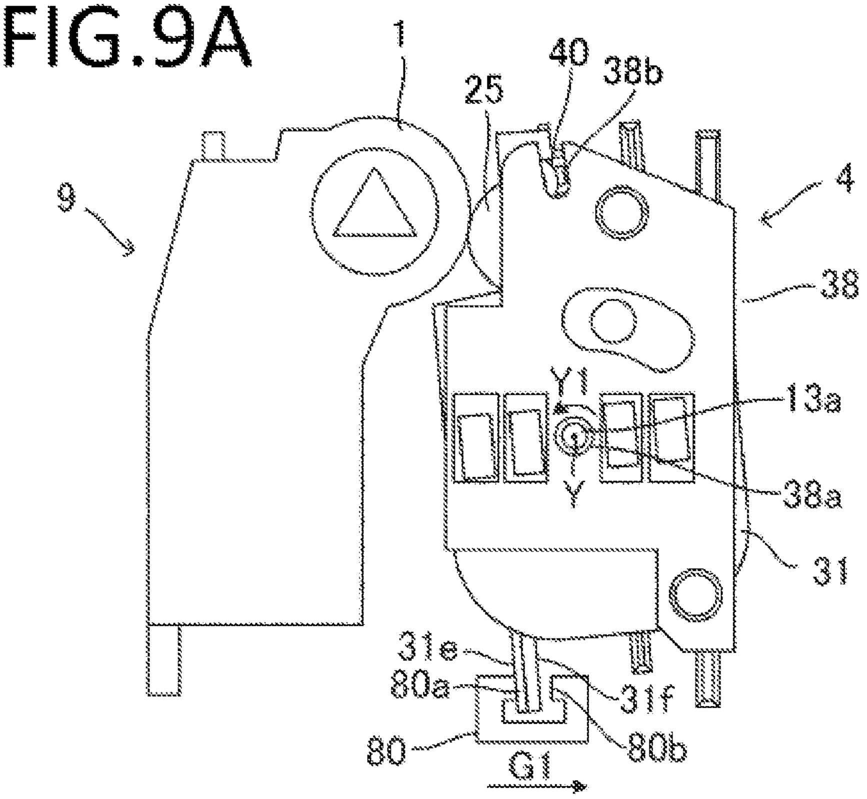
FIGS. 9A and 9B are views showing the operation of a developing roller and a photosensitive drum coming into contact and separating.
Figure 9B:
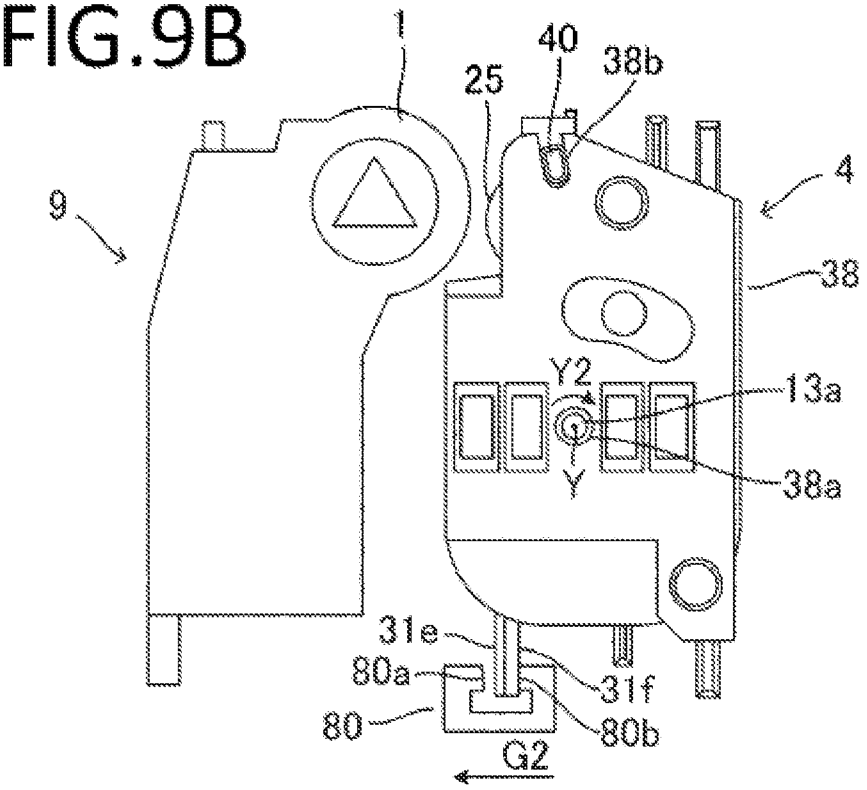

Next, an operation for a movement in which the photosensitive drum 1 and the developing roller 25 make contact with or separate in this embodiment will be described using FIGS. 9A and 9B. FIGS. 9A and 9B are views showing the operation of the developing roller 25 and the photosensitive drum 1 coming into contact and separating. As shown in FIGS. 9A and 9B, the lower part of the developing frame body 31 is provided with a development pressurization receiving portion 31*e* that receives the pressurizing force from the body of the image forming apparatus 100. The body of the image forming apparatus 100 is provided with a developing cartridge pressurizing member 80 that is movable in a G1 direction and a G2 direction in FIGS. 9A and 9B.

As described above, in a state where the developing cartridge 4 has been attached, the restricting member 40 is pressed in the P direction by the restriction releasing portion, the far-side end portion holder 38 and the restricting member 40 are disengaged, and the developing frame body 31 is made capable of turning with respect to the far-side end portion holder 38. In this state, the developing cartridge pressurizing member 80 moves in the G1 direction in FIG. 9A, causing a pressurizing portion 80*a* of the developing cartridge pressurizing member 80 to come into contact with the development pressurization receiving portion 31*e*. Accordingly, the developing frame body 31 swings in an arrow Y1 direction, and the developing roller 25 presses the photosensitive drum 1 with a predetermined pressure. In the case where the developing cartridge pressurizing member 80 has moved in the G2 direction in FIG. 9B, a separating portion 80*b* of the developing cartridge pressurizing member 80 comes into contact with a development separating-pressurization receiving portion 31*f* to swing the developing frame body 31 in an arrow Y2 direction and separate the developing roller 25 and the photosensitive drum 1. With such a configuration, in the case of not forming an image on the recording medium S, the developing roller 25 and the photosensitive drum 1 can be brought to a separated state.

Accordingly, deterioration in image quality due to a deformation of the developing roller 25 can be prevented.

<Configuration for Developing Cartridge 4 being Attached to or Detached from Body of Image Forming Apparatus 100>

Figure 1:
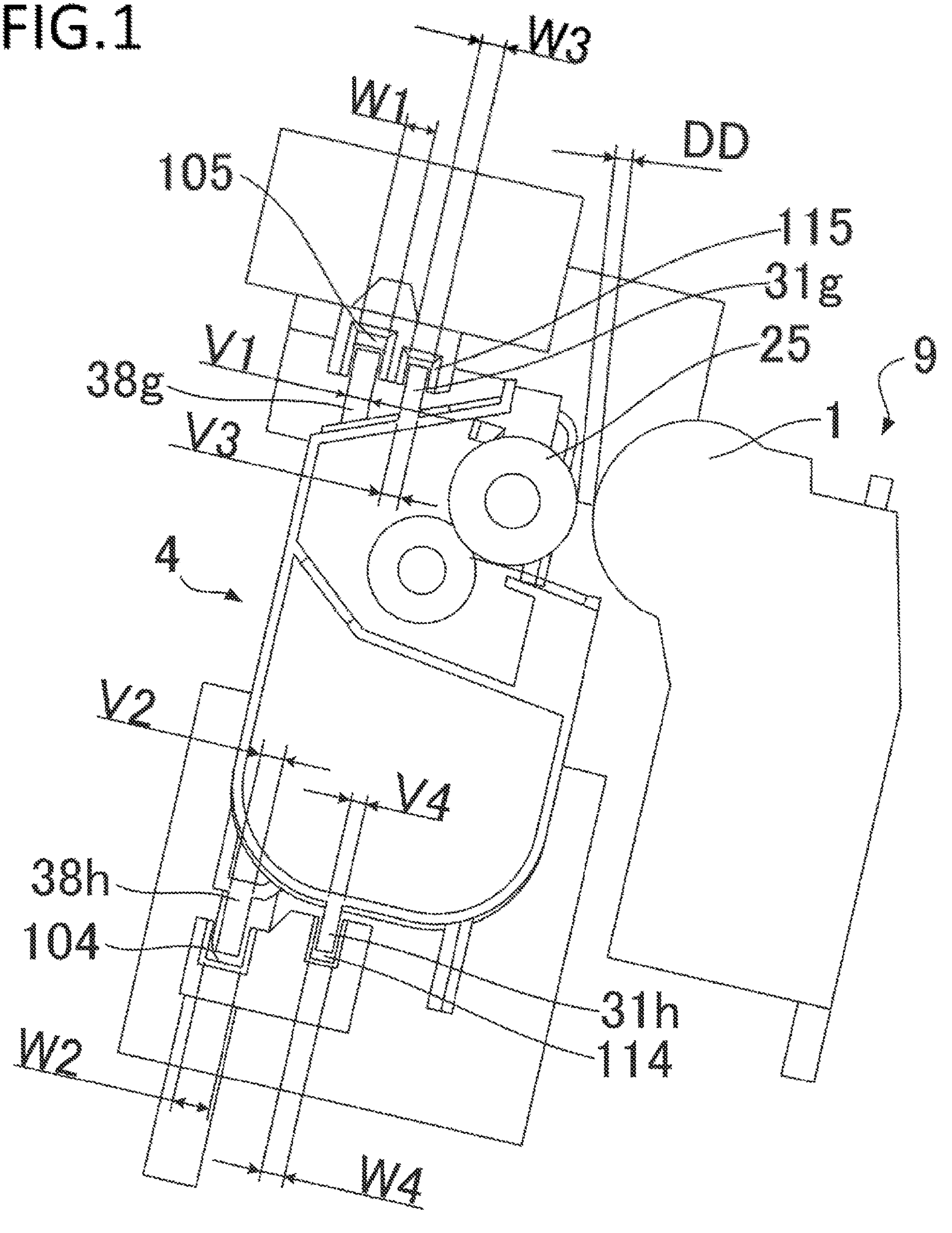
FIG. 1 is a view showing the configuration of a guide mechanism according to Embodiment 1.
Figure 10:
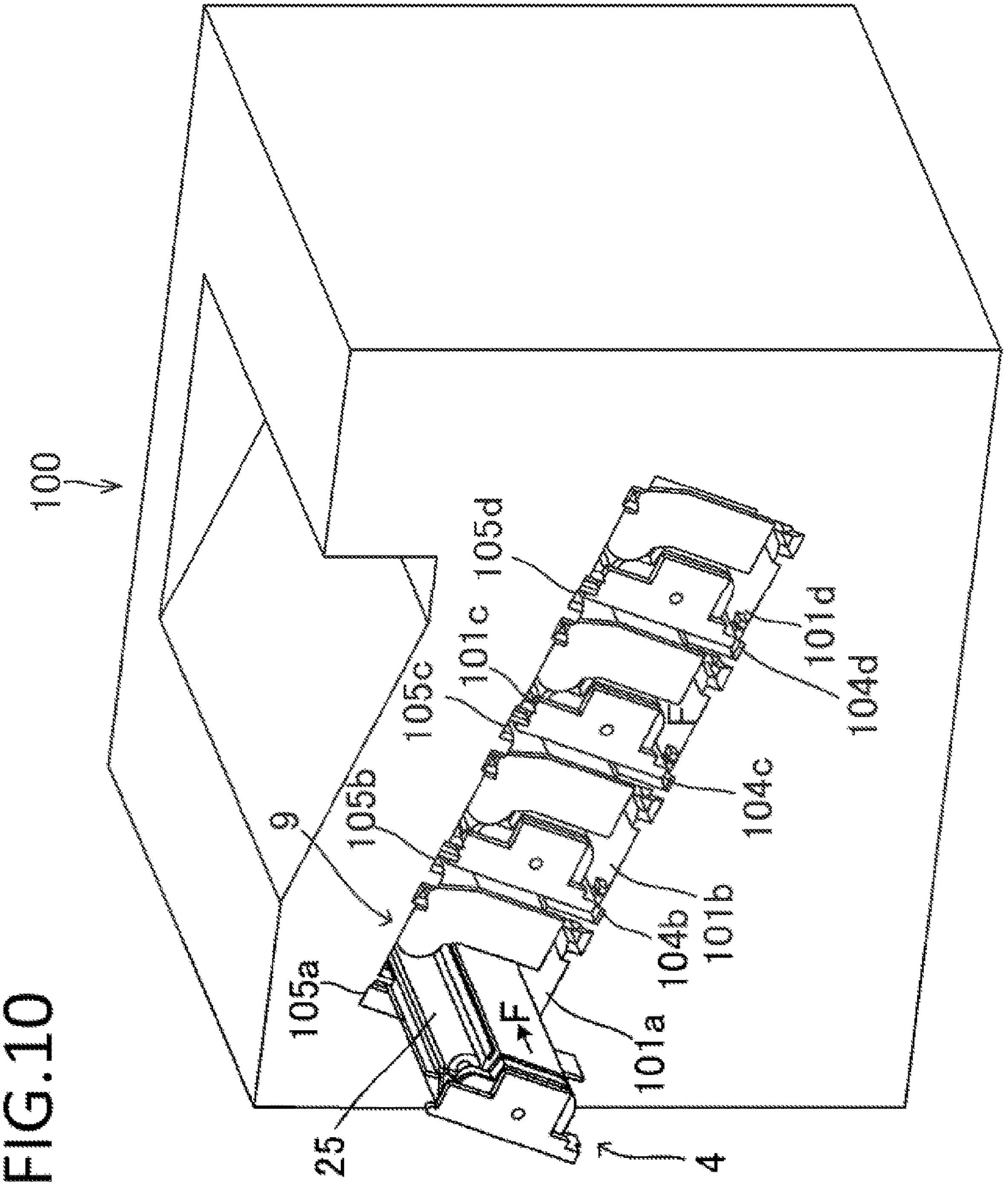
FIG. 10 is a view showing the operation of the developing cartridge being attached to or detached from the body of the image forming apparatus.
Figure 12:
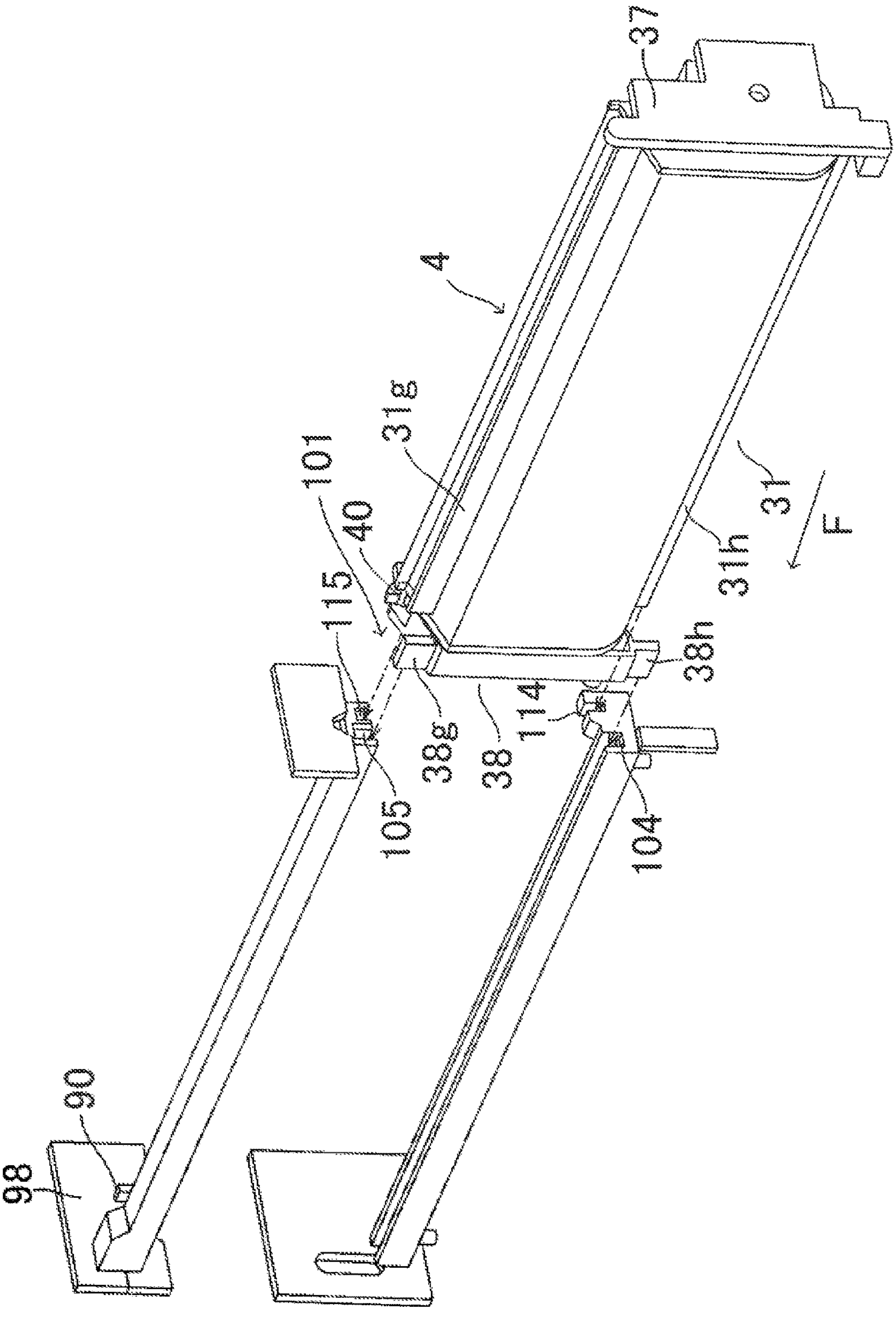
FIG. 12 is a view showing the developing cartridge being attached with respect to the body.
Figure 13:
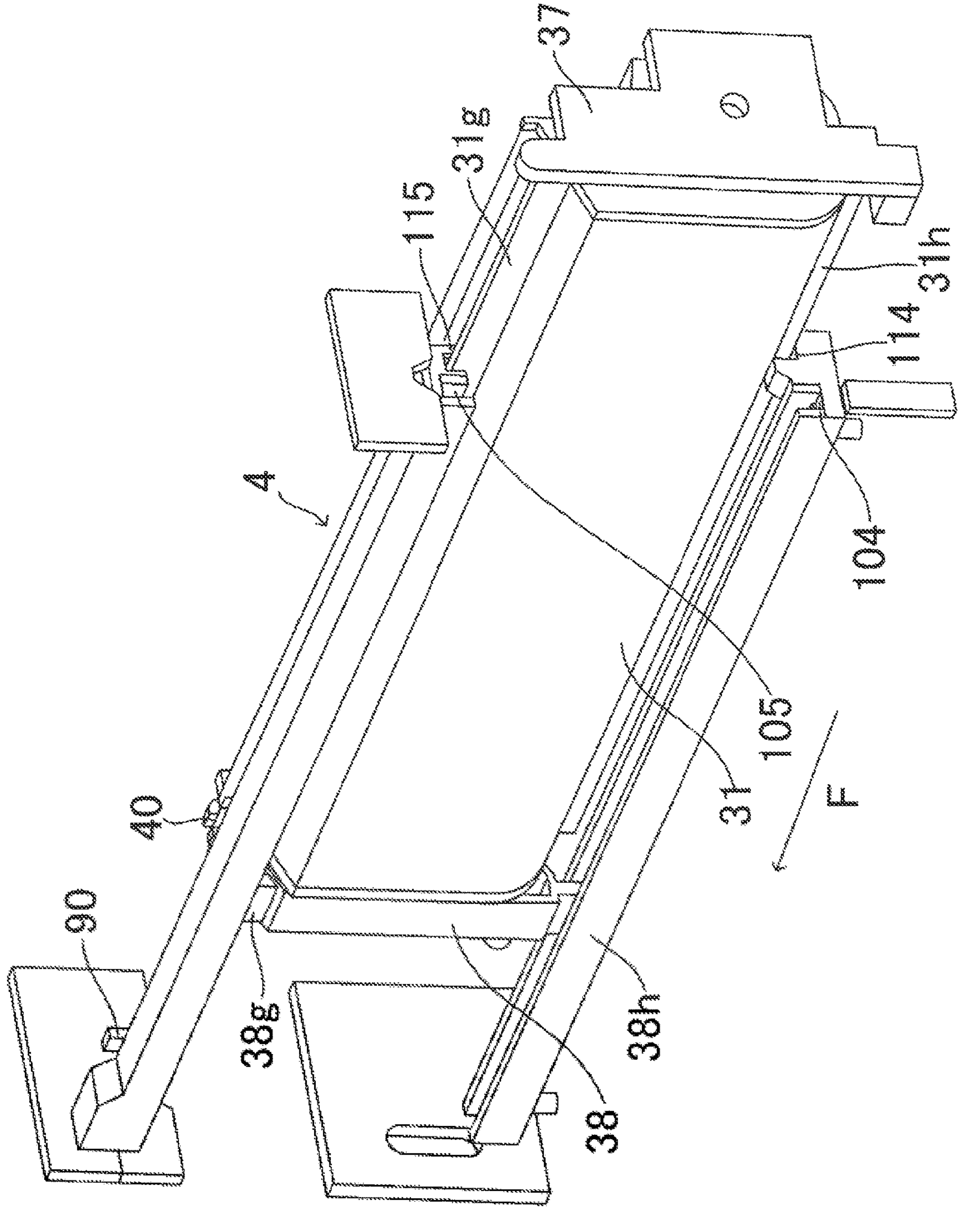
FIG. 13 is a view showing the developing cartridge being attached with respect to the body.
Figure 14:
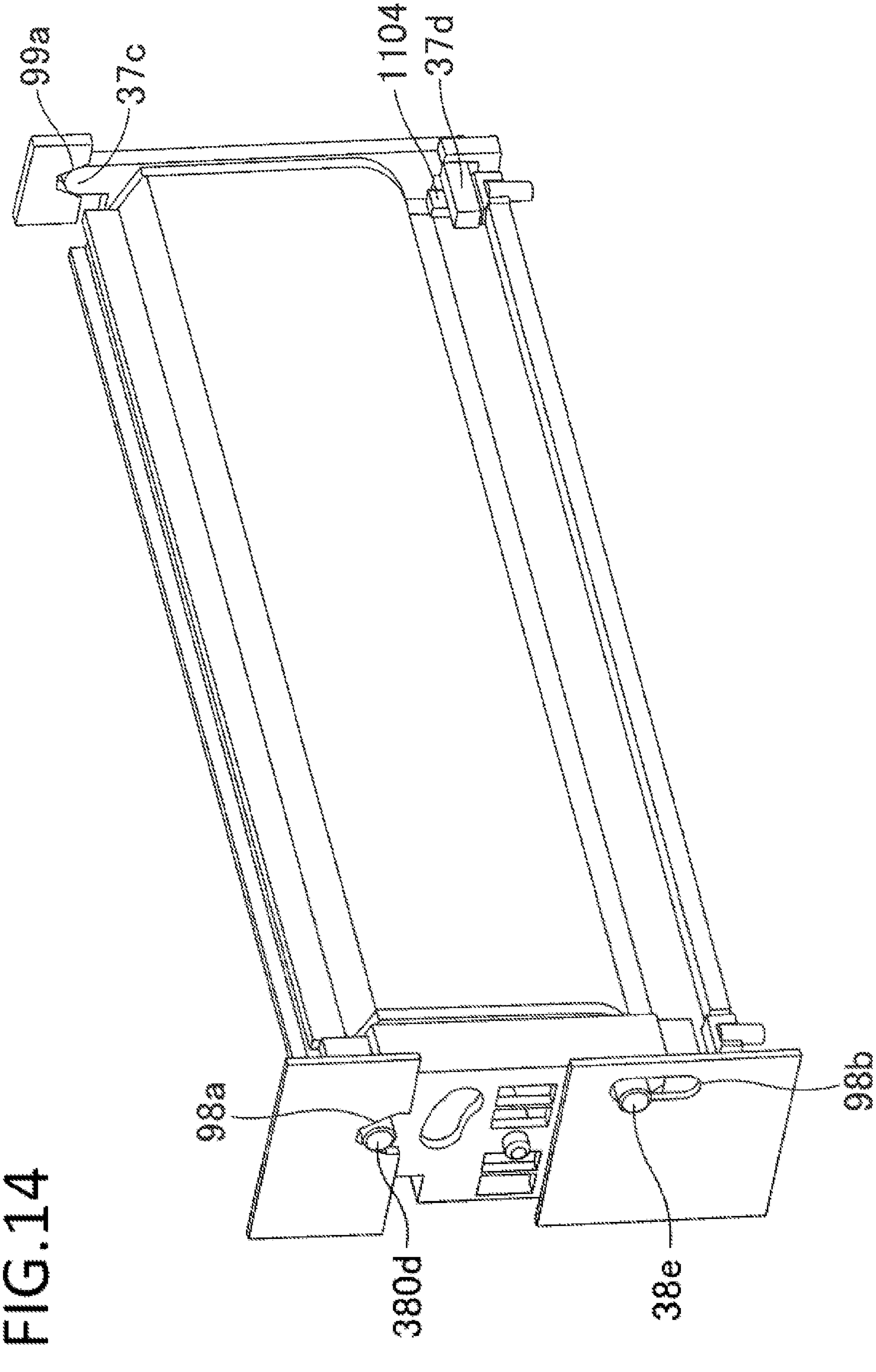
FIG. 14 is a view showing a state where the developing cartridge has been attached with respect to the body.

Next, using FIGS. 1 and 10 to 14, the operation of attaching the developing cartridge 4 to the body of the image forming apparatus 100 will be described. FIG. 1 is a view showing the configuration of a guide mechanism according to Embodiment 1. FIG. 10 is a view showing the operation of the developing cartridge 4 being attached to or detached from the body of the image forming apparatus 100. FIGS. 11 to 13 are views showing the developing cartridge 4 being attached with respect to the body of the image forming apparatus 100. FIG. 14 is a view showing a state where the developing cartridge 4 has been attached with respect to the body of the image forming apparatus 100.

In this embodiment, the developing cartridges 4 (4Y, 4M, 4C, and 4K) are inserted to opening portions 101 (101*a*, 101*b*, 101*c*, and 101*d*) of the image forming apparatus 100. The developing cartridge 4 is inserted to the body of the image forming apparatus 100 toward the far side from the near side, in a direction (an arrow F direction in FIG. 10) parallel to the direction of the central axis of rotation of the developing roller 25 (25*a*, 25*b*, 25*c*, or 25*d*).

Figure 11A:
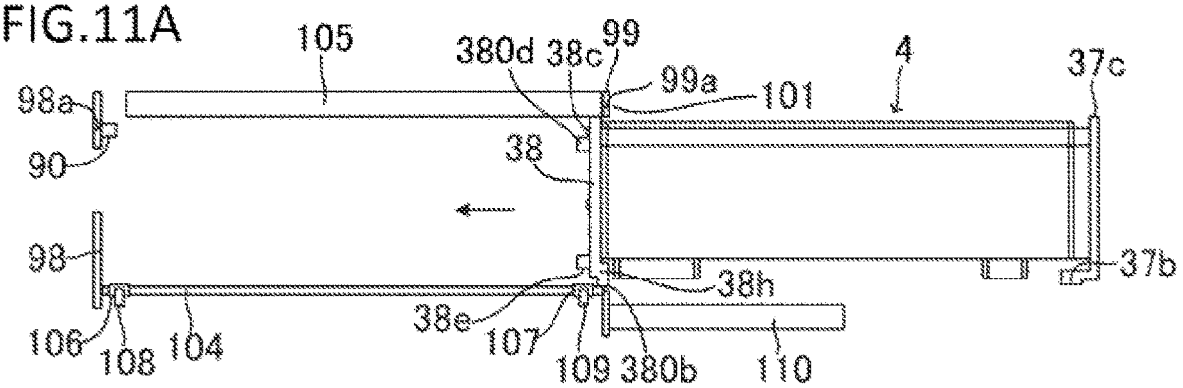
FIGS. 11A to 11C are views showing the developing cartridge being attached with respect to the body.
Figure 11B:
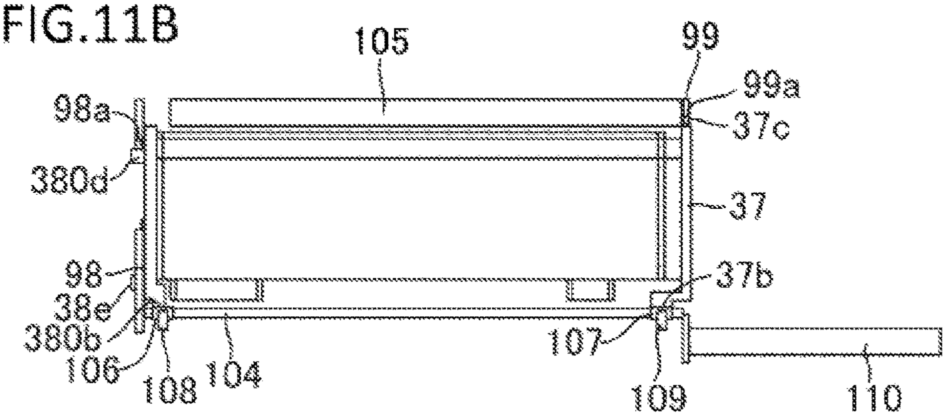
Figure 11C:
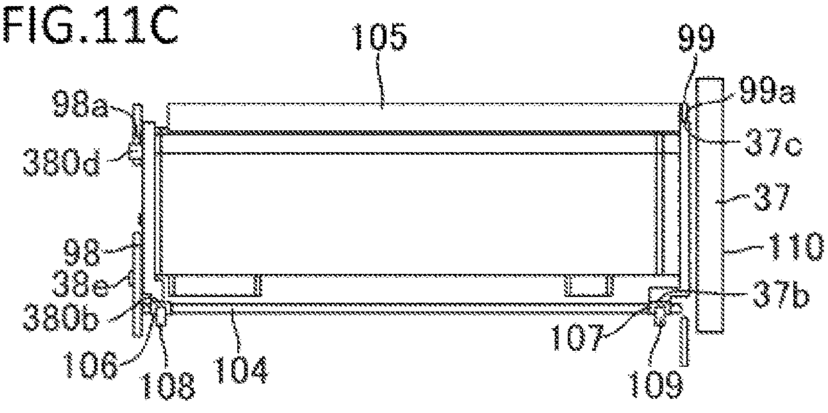

As shown in FIGS. 11A to 11C, a near cover 110 capable of being opened or closed is provided on the near side in the body of the image forming apparatus 100. Opening the near cover 110 exposes the opening portion 101 for inserting the developing cartridge 4. On the upper side in the opening portion 101, as shown in FIG. 12, a first upper guide 105 as a guide member extending to the far side from the near side and a second upper guide 115 arranged only on the near side are provided. In this embodiment, the first upper guide 105 and the second upper guide 115 are groove-shaped (recess-shaped). On the lower side of the opening portion 101, a first lower guide 104 as a guide member extending to the far side from the near side and a second lower guide 114 as a restricting portion arranged only on the near side are provided. In this embodiment, the first lower guide 104 and the second lower guide 114 are groove-shaped (recess-shaped).

In the far-side end portion holder 38, a first upper guide rib 38*g* protrudes in the upper direction (approximately the vertical direction in this embodiment) orthogonal to the direction of attachment or detachment (the horizontal direction in this embodiment) of the developing cartridge 4, and a first lower guide rib 38*h* protrudes in the lower direction. In the developing frame body 31, a second upper guide rib 31*g* as a restricted portion extending in the direction of the central axis of rotation of the developing roller 25 protrudes in the upper direction, and a second lower guide rib 31*h* as a restricted portion extending in the direction of the central axis of rotation of the developing roller 25 protrudes in the lower direction. As described above, in a state where the developing cartridge 4 is not attached to the body of the image forming apparatus 100, the turn of the developing frame body 31 of the developing cartridge 4 with respect to the far-side end portion holder 38 is restricted by the restricting member 40. In this manner, in this embodiment, the image forming apparatus 100 includes a restricting mechanism to restrict the turn of the developing frame body 31 with respect to the far-side end portion holder 38.

When inserting the developing cartridge 4 to the body of the image forming apparatus 100, the first upper guide rib 38*g* provided to the far-side end portion holder 38 is first engaged with the first upper guide 105 provided to the body side of the image forming apparatus 100. The first lower guide rib 38*h* provided to the far-side end portion holder 38 is engaged with the first lower guide 104 provided to the body side of the image forming apparatus 100. In that state, the developing cartridge 4 is pushed in the arrow F direction in FIG. 10, causing the first lower guide rib 38*h* and the second lower guide rib 31*h* to slide with respect to the first lower guide 104 and the second lower guide 114.

Then, at a timing in which the developing frame body 31 enters the opening portion 101, the second upper guide rib 31*g* provided to the developing frame body 31 is engaged with the second upper guide 115 as a restricting portion provided to the body side of the image forming apparatus 100. The second lower guide rib 31*h* provided to the developing frame body 31 is engaged with the second lower guide 114 provided to the body side of the image forming apparatus 100. In this state, the first upper guide rib 38*g* is engaged with the first upper guide 105, and the first lower guide rib 38*h* is engaged with the first lower guide 104. Therefore, the developing cartridge 4 is in a state of being supported by the first lower guide 104, the first upper guide 105, the second lower guide 114, and the second upper guide 115 (see FIGS. 1 and 13). In this embodiment, the positions in which the second upper guide rib 31*g* and the second upper guide 115 are provided are contained in the developing cartridge 4, when the developing cartridge 4 is projected in a direction orthogonal to the direction in which the developing cartridge 4 is aligned with the drum cartridge 9. The positions in which the second lower guide rib 31*h* and the second lower guide 114 are provided are contained in the developing cartridge 4, when the developing cartridge 4 is projected in a direction orthogonal to the direction in which the developing cartridge 4 is aligned with the drum cartridge 9.

In this embodiment shown in FIG. 1, the relation of a width W1 of the first upper guide 105 and a width V1 of the first upper guide rib 38*g* and the relation of a width W2 of the first lower guide 104 and a width V2 of the first lower guide rib 38*h* are as shown below. In a similar manner, the relation of a width W3 of the second upper guide 115 and a width V3 of the second upper guide rib 31*g* and the relation of a width W4 of the second lower guide 114 and a width V4 of the second lower guide rib 31*h* are as shown below.

$$Wi-Vi=1.0\text{ mm (where } i \text{ equals 1 to 4)}$$

In a state where the developing cartridge 4 has been attached to the body of the image forming apparatus 100, a clearance DD between the developing roller 25 and the photosensitive drum 1 is set to 4 mm. Thus, in a state where the developing cartridge 4 has been attached to the body of the image forming apparatus 100, the developing roller 25 and the photosensitive drum 1 can be prevented from making contact, even if the developing cartridge 4 has moved.

When the developing cartridge 4 is inserted up to a predetermined position, a climbing portion 380*b* of the first lower guide rib 38*h* of the far-side end portion holder 38 climbs onto a far-side pressurizing member 106 provided on the far side of the first lower guide 104, as shown in FIG. 11B. A climbing portion 37*b* provided to the near-side end portion holder 37 climbs onto a near-side pressurizing member 107 provided on the near side of the first lower guide 104. At this time, the second upper guide rib 31*g* provided to the developing frame body 31 and the second upper guide 115 have been disengaged, and the second lower guide rib 31*h* and the second lower guide 114 have been disengaged.

A butting portion 38*c* provided to the far-side end portion holder 38 reaches and comes into contact with a far-side plate 98 in the body of the image forming apparatus 100. Accordingly, in the direction of insertion of the developing cartridge 4, the developing cartridge 4 is positioned. The position in which the butting portion 38*c* and the far-side plate 98 come into contact is the attachment position. The far-side plate 98 provided to the body of the image forming apparatus 100 is provided with a restriction releasing portion 90 for pressing the restricting member 40 of the developing cartridge 4. By the restricting member 40 being pressed by the restriction releasing portion 90 in a state where the developing cartridge 4 has been attached to the body of the image forming apparatus 100, the groove portion 38*b* of the far-side end portion holder 38 and the restricting member 40 are disengaged.

FIG. 11C is a view showing a state where the developing cartridge 4 has been positioned with respect to the body of the image forming apparatus 100. In coordination with the operation of closing the near cover 110 of the image forming apparatus 100, the first lower guide 104 including the far-side pressurizing member 106, the near-side pressurizing member 107, a body pressurizing spring 108, and a body pressurizing spring 109 moves upward. Along with the operation, a far-side positioning portion 380*d* of the far-side end portion holder 38 comes into contact with a butting portion 98*a* of the far-side plate 98 (see FIG. 14). A near-side positioning portion 37*c* of the near-side end portion holder 37 comes into contact with a butting portion 99*a* of a near-side plate 99. Accordingly, the developing cartridge 4 is positioned with respect to the body of the image forming apparatus 100.

Further, as shown in FIG. 14, the far-side end portion holder 38 is provided with a boss 38*e* for restricting the rotation of the far-side end portion holder 38. In a state where the developing cartridge 4 has been attached to the body of the image forming apparatus 100, the boss 38*e* of the far-side end portion holder 38 is fitted in a rotation stopping hole portion 98*b* of the far-side plate 98. Accordingly, the far-side end portion holder 38 can be prevented from rotating within the image forming apparatus 100.

In a similar manner, the near-side end portion holder 37 is provided with a rotation stopper 37*d* for restricting the rotation of the near-side end portion holder 37. In a state where the developing cartridge 4 has been attached to the body of the image forming apparatus 100, the rotation stopper 37*d* of the near-side end portion holder 37 is fitted with a body rotation stopping portion 1104 provided to the first lower guide 104. Accordingly, the near-side end portion holder 37 can be prevented from rotating within the image forming apparatus 100.

In the above manner, in this embodiment, the far-side end portion holder 38 and the near-side end portion holder 37 are fixed with respect to the body of the image forming apparatus 100, in a state where the developing cartridge 4 has been completely attached to the body of the image forming apparatus 100. By the groove portion 38*b* and the restricting member 40 being disengaged in the state where the developing cartridge 4 has been completely attached to the body of the image forming apparatus 100, the developing frame body 31 is made capable of turning with respect to the far-side end portion holder 38. In the state where the developing cartridge 4 has been completely attached to the body of the image forming apparatus 100, the second upper guide rib 31*g* and the second upper guide 115 are disengaged, and the second lower guide rib 31*h* and the second lower guide 114 are disengaged. Therefore, the developing frame body 31 is made capable of turning within the image forming apparatus 100, and the developing roller 25 and the photosensitive drum 1 are made capable of coming into contact or separating.

During the insertion of the developing cartridge 4 to the body of the image forming apparatus 100, the rotation of the developing frame body 31 with respect to the far-side end portion holder 38 can be restricted by the restricting member 40. During the insertion of the developing cartridge 4 to the body of the image forming apparatus 100, the second lower guide rib 31*h* of the developing frame body 31 and the second lower guide 114 are engaged, and the second upper guide rib 31*g* of the developing frame body 31 and the second upper guide 115 are engaged. Accordingly, during the insertion of the developing cartridge 4 to the body of the image forming apparatus 100, the turn of the developing frame body 31 is restricted. As described above, during the insertion of the developing cartridge 4 to the body of the image forming apparatus 100, the far-side end portion holder 38 is positioned in a direction orthogonal to the direction of insertion of the developing cartridge 4. Accordingly, the developing frame body 31 is prevented from turning with respect to the body of the image forming apparatus 100, and the developing roller 25 and the photosensitive drum 1 are prevented from making contact. During the insertion of the developing cartridge 4 to the body of the image forming apparatus 100, wobbling of the developing cartridge 4 can be reduced, and the developing roller 25 and the photosensitive drum 1 can be prevented from making contact.

In this embodiment, only the turn of the far-side end portion holder 38 with respect to the developing frame body 31 is restricted by the restricting member 40. However, this is not necessarily limiting. For example, the turn of the near-side end portion holder 37 with respect to the developing frame body 31 may also be restricted by the restricting member 40.

In this embodiment, the configuration is such that respective guide ribs protrude in a direction orthogonal to the direction of alignment of a plurality of process cartridges. The arrangement for a rotation restricting configuration according to this embodiment is such that the position is contained in the developing cartridge when projected in a direction orthogonal to the direction of alignment. That is, the rotation restricting configuration does not bulge outward in the direction of alignment, and therefore the configuration does not affect the arrangement and design of the plurality of process cartridges. Thus, in an inline image forming apparatus, a gap between adjacent process cartridges can be kept to a minimum to achieve the rotation restriction described above, while avoiding an increase in size of the apparatus.

Embodiment 2

Figure 15:
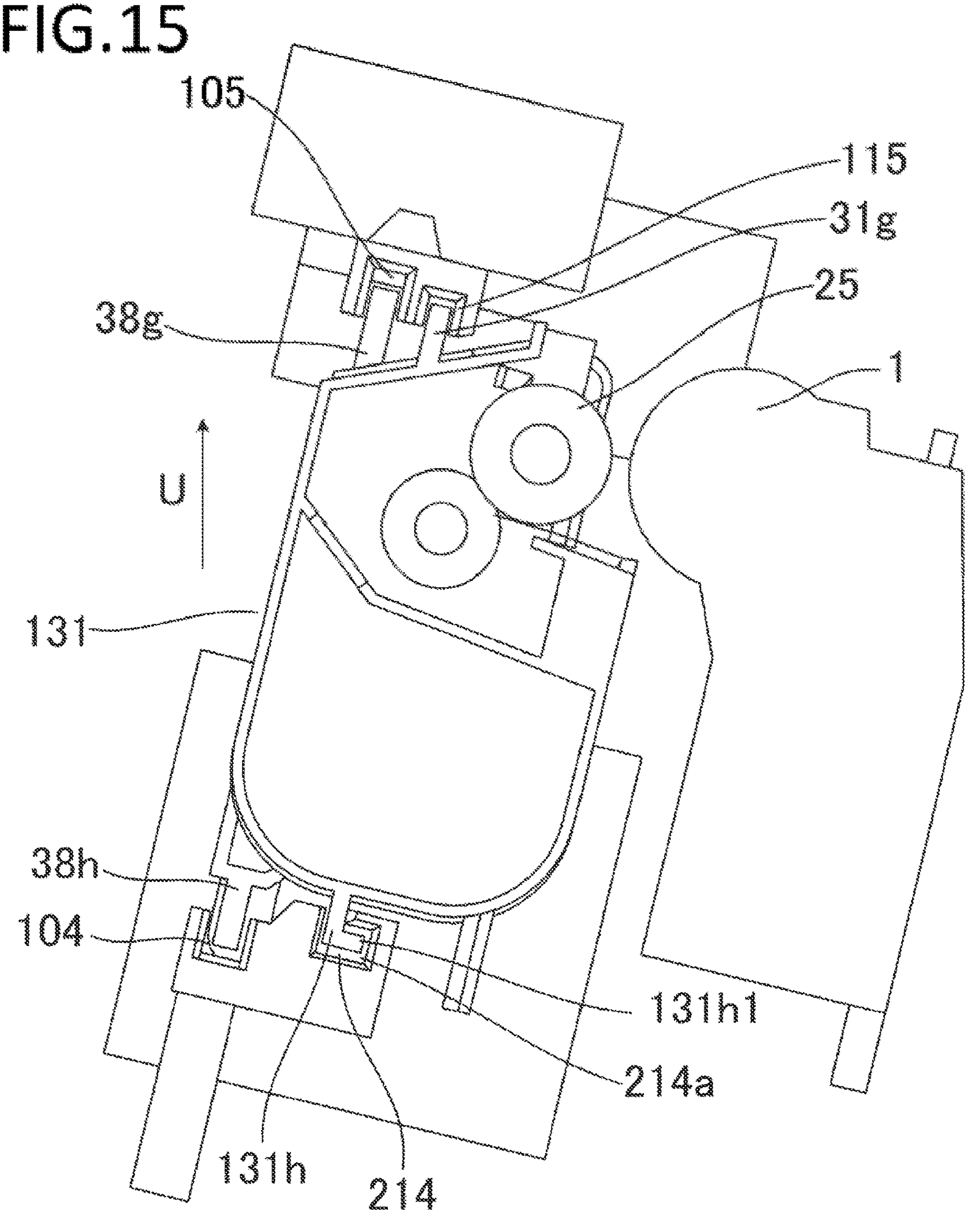
FIG. 15 is a view showing the configuration of a guide mechanism according to Embodiment 2.

Next, Embodiment 2 will be described using FIG. 15. In this embodiment, portions having the same function as in Embodiment 1 will be, to omit description thereof, denoted by the same reference sign. FIG. 15 is a view showing the configuration of a guide mechanism according to Embodiment 2. As shown in FIG. 15, Embodiment 2 differs from Embodiment 1 in that a developing frame body 131 is guided by a second lower guide 214. A second lower guide rib 131*h* of the developing frame body 131 includes an L-shaped portion 131*h*1 and is hook-shaped. The second lower guide 214 that engages with the second lower guide rib 131*h* at the time of the developing cartridge 4 being attached to or detached from the body of the image forming apparatus 100 includes a recess portion 214*a* and is hook-shaped.

In this embodiment, the second lower guide rib 131*h* and the second lower guide 214 being hook-shaped can prevent the developing cartridge 4 from moving in the upper direction (a U direction in FIG. 15) during attachment or detachment of the developing cartridge 4. Specifically, even if the developing cartridge 4 has been raised in the upper direction, the L-shaped portion 131*h*1 of the second lower guide rib 131*h* in the developing frame body 131 and the recess portion 214*a* of the second lower guide 214 are in engagement.

Therefore, within the image forming apparatus 100, the developing cartridge 4 can be prevented from moving in the U direction. At the time of the developing cartridge 4 being attached to or detached from the body of the image forming apparatus 100, wobbling of the developing cartridge 4 in the up-down direction can also be reduced. Accordingly, at the time of the developing cartridge 4 being attached to or detached from the body of the image forming apparatus 100, the developing roller 25 and the photosensitive drum 1 can be prevented from making contact.

In the above manner, in Embodiment 2, the second lower guide rib 131*h* of the developing frame body 131 is hook-shaped, and the second lower guide 214 that engages with the second lower guide rib 131*h* is hook-shaped. Therefore, with a normal arrangement and posture of the image forming apparatus 100, the second lower guide 214 restricts the movement of the second lower guide rib 131*h* in the up-down direction. Accordingly, the movement of the developing cartridge 4 can be restricted in the up-down direction.

In the respective embodiments, the second upper guide rib 31*g* and the second lower guide rib 31*h* (or the second lower guide rib 131*h*) (on one side) are protrusion-shaped (a protrusion portion). The second upper guide 115 and the second lower guide 114 (or the second lower guide 214) (on the other side) are recess-shaped. However, this is not necessarily limiting. For example, it may be such that the second upper guide rib 31*g* and the second lower guide rib 31*h* (or the second lower guide rib 131*h*) are recess-shaped, and the second upper guide 115 and the second lower guide 114 (or the second lower guide 214) are protrusion-shaped.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-038460, filed on Feb. 29, 2016, and No. 2017-026341, filed on Feb. 15, 2017, which are hereby incorporated by reference herein in their entirety.

What is claimed is:

1. An image forming apparatus comprising:

a main body including a pressing member; and a developing cartridge detachably mountable to the main body, the developing cartridge including:

a developing roller configured to contact a photosensitive drum, the developing roller being rotatable about a rotational axis of the developing roller, a developing frame provided with a toner accommodating chamber, the developing frame including a first end portion with respect to a direction of the rotational axis of the developing roller, and a second end portion that is opposite to the first end portion with respect to the direction of the rotational axis of the developing roller, a pressed member, a spring urging the pressed member, a member provided at the first end portion, the member provided with an opening, a developing coupling provided at the first end portion, the developing coupling configured to receive a driving force from the main body, and a gear provided at the second end portion and a rotator to which the gear is attached, the rotator being configured to transmit the driving force from the coupling to the gear, wherein, in a state where the developing cartridge is detached from the main body, at least part of the pressed member is exposed from the opening, and wherein, in a state where the developing cartridge is mounted to the main body, the pressing member presses the pressed member such that the spring is compressed.

2. An image forming apparatus according to claim 1, wherein the gear is a first gear, and wherein the developing cartridge includes a second gear meshing with the first gear.

3. An image forming apparatus according to claim 2, wherein the developing coupling is configured to receive the driving force and the developing coupling is operatively connected to the developing roller such that the driving force is transmitted from the developing coupling to the developing roller, and the developing roller is thereby rotated.

4. An image forming apparatus according to claim 3, wherein the developing cartridge includes a toner supply roller configured to rotate while contacting the developing roller, and wherein the developing coupling is configured to receive the driving force and the developing coupling is operatively connected to the developing roller and the toner supply roller such that the driving force is transmitted from the developing coupling to the developing roller and the toner supply roller, and the developing roller and the toner supply roller are thereby rotated.

5. An image forming apparatus according to claim 4, further comprising a drum cartridge detachably mounted to the main body, the drum cartridge including the photosensitive drum.

6. An image forming apparatus according to claim 5, wherein the spring urges the pressed member toward outside of the developing cartridge.

7. An image forming apparatus according to claim 1, wherein the developing coupling is configured to receive the driving force and the developing coupling is operatively connected to the developing roller such that the driving force is transmitted from the developing coupling to the developing roller, and the developing roller is thereby rotated.

8. An image forming apparatus according to claim 7, wherein the developing cartridge includes a toner supply roller configured to rotate while contacting the developing roller, and wherein the developing coupling is configured to receive the driving force and the developing coupling is operatively connected to the developing roller and the toner supply roller such that the driving force is transmitted from the developing coupling to the developing roller and the toner supply roller, and the developing roller and the toner supply roller are thereby rotated.

9. An image forming apparatus according to claim 1, further comprising a drum cartridge including the photosensitive drum.

10. An image forming apparatus according to claim 1, wherein the spring urges the pressed member toward outside of the developing cartridge.

11. A developing cartridge configured to be detachably mounted to a main body of an image forming apparatus, the main body including a pressing member, the developing cartridge comprising:

a developing roller configured to contact a photosensitive drum, the developing roller being rotatable about a rotational axis of the developing roller;

a developing frame provided with a toner accommodating chamber, the developing frame including a first end portion with respect to a direction of the rotational axis of the developing roller, and a second end portion that is opposite to the first end portion with respect to the direction of the rotational axis of the developing roller;

a pressed member;

a spring urging the pressed member;

a member provided at the first end portion, the member provided with an opening;

a developing coupling provided at the first end portion, the developing coupling being configured to receive a driving force from the main body; and a gear provided at the second end portion and a rotator to which the gear is attached, the rotator being configured to transmit the driving force from the coupling to the gear, wherein, in a state where the developing cartridge is detached from the main body, at least part of the pressed member is exposed from the opening, and wherein, in a state where the developing cartridge is mounted to the main body, the pressing member presses the pressed member such that the spring is compressed.

12. A developing cartridge according to claim 11, wherein the gear is a first gear, and wherein the developing cartridge includes a second gear meshing with the first gear.

13. A developing cartridge according to claim 12, wherein the developing coupling is configured to receive the driving force and the developing coupling is operatively connected to the developing roller such that the driving force is transmitted from the developing coupling to the developing roller, and the developing roller is thereby rotated.

14. A developing cartridge according to claim 13, wherein the developing cartridge includes a toner supply roller configured to rotate while contacting the developing roller, and wherein the developing coupling is configured to receive the driving force and the developing coupling is operatively connected to the developing roller and the toner supply roller such that the driving force is transmitted from the developing coupling to the developing roller and the toner supply roller, and the developing roller and the toner supply roller are thereby rotated.

15. A developing cartridge according to claim 14, wherein the spring urges the pressed member toward outside of the developing cartridge.

16. A developing cartridge according to claim 11, wherein the developing coupling is configured to receive the driving force and the developing coupling is operatively connected to the developing roller such that the driving force is transmitted from the developing coupling to the developing roller, and the developing roller is thereby rotated.

17. A developing cartridge according to claim 16, wherein the developing cartridge includes a toner supply roller configured to rotate while contacting the developing roller, and wherein the developing coupling is configured to receive the driving force and the developing coupling is operatively connected to the developing roller and the toner supply roller such that the driving force is transmitted from the developing coupling to the developing roller and the toner supply roller, and the developing roller and the toner supply roller are thereby rotated.

18. A developing cartridge according to claim 11, wherein the spring urges the pressed member toward outside of the developing cartridge.

19. An image forming apparatus comprising:

a main body including a pressing member; and a developing cartridge detachably mountable to the main body, the developing cartridge including:

a developing roller configured to contact a photosensitive drum, the developing roller being rotatable about a rotational axis of the developing roller, a developing frame provided with a toner accommodating chamber, the developing frame including an end portion with respect to a direction of the rotational axis of the developing roller, a pressed member, a spring urging the pressed member, a member provided at the end portion, the member provided with an opening, a developing coupling provided at the end portion, the developing coupling configured to receive a driving force from the main body, and a toner supplying roller configured to rotate while contacting the developing roller, wherein, in a state where the developing cartridge is detached from the main body, at least part of the pressed member is exposed from the opening, and wherein, in a state where the developing cartridge is mounted to the main body, the pressing member presses the pressed member such that the spring is compressed, wherein the developing coupling is configured to receive the driving force and the developing coupling is operatively connected to the developing roller and the toner supply roller such that the driving force is transmitted from the developing coupling to the developing roller and the toner supply roller, and the developing roller and the toner supply roller are thereby rotated.

20. A developing cartridge configured to be detachably mounted to a main body of an image forming apparatus, the main body including a pressing member, the developing cartridge comprising:

a developing roller configured to contact a photosensitive drum, the developing roller being rotatable about a rotational axis of the developing roller;

a developing frame provided with a toner accommodating chamber, the developing frame including an end portion with respect to a direction of the rotational axis of the developing roller;

a pressed member;

a spring urging the pressed member;

a member provided at the end portion, the member provided with an opening;

a developing coupling provided at the end portion, the developing coupling being configured to receive a driving force from the main body; and a toner supplying roller configured to rotate while contacting the developing roller, wherein, in a state where the developing cartridge is detached from the main body, at least part of the pressed member is exposed from the opening, and wherein, in a state where the developing cartridge is mounted to the main body, the pressing member presses the pressed member such that the spring is compressed, wherein the developing coupling is configured to receive the driving force and the developing coupling is operatively connected to the developing roller and the toner supply roller such that the driving force is transmitted from the developing coupling to the developing roller and the toner supply roller, and the developing roller and the toner supply roller are thereby rotated.

* * * * *